(12) United States Patent
Beck et al.

(10) Patent No.: US 11,854,053 B2
(45) Date of Patent: Dec. 26, 2023

(54) METHODS FOR GRAPHICAL DEPICTION OF A VALUE OF A PROPERTY OF A MATERIAL

(71) Applicant: Covestro LLC, Pittsburgh, PA (US)

(72) Inventors: Angela M. Beck, Monongahela, PA (US); David D. Steppan, Gibsonia, PA (US); Chetan Ghosalkar, McDonald, PA (US); Carol Knox, Apollo, PA (US)

(73) Assignee: COVESTRO LLC, Pittsburgh, PA (US)

( * ) Notice: Subject to any disclaimer, the term of this patent is extended or adjusted under 35 U.S.C. 154(b) by 216 days.

(21) Appl. No.: 17/615,868

(22) PCT Filed: Jun. 23, 2020

(86) PCT No.: PCT/US2020/039077
§ 371 (c)(1),
(2) Date: Dec. 2, 2021

(87) PCT Pub. No.: WO2020/263791
PCT Pub. Date: Dec. 30, 2020

(65) Prior Publication Data
US 2022/0318863 A1     Oct. 6, 2022

Related U.S. Application Data

(60) Provisional application No. 62/868,227, filed on Jun. 28, 2019.

(51) Int. Cl.
*G06F 3/04812* (2022.01)
*G06Q 30/0283* (2023.01)
(Continued)

(52) U.S. Cl.
CPC ..... *G06Q 30/0283* (2013.01); *G06F 3/04812* (2013.01); *G06F 3/04847* (2013.01); *G06Q 10/06* (2013.01)

(58) Field of Classification Search
CPC .... G06F 3/04847; G06F 3/0482; G06F 30/20; G06F 17/10; G06F 17/5009; G06F 30/00;
(Continued)

(56) References Cited

U.S. PATENT DOCUMENTS 5,226,118 A * 7/1993 Baker ................ G05B 23/0232
715/833
5,717,091 A    2/1998 Richter et al.
(Continued)

FOREIGN PATENT DOCUMENTS

AU   2009341850 A1 * 9/2011 ............. G01V 11/00
AU   2014232218 A1 * 10/2015 ........... B29C 64/386
(Continued)

OTHER PUBLICATIONS

International Search Report, PCT/US2020/039077, dated Sep. 16, 2020, Authorized officer: Benedikt Thielemann.
(Continued)

*Primary Examiner* — Steven P Sax
(74) *Attorney, Agent, or Firm* — Richard P. Bender

(57) ABSTRACT

A method of producing a graphical depiction of a value of a property of a material is provided. The method comprises generating, by a processing unit, a plot defining a geometric shape, a first axis comprising a plurality of first variables, and a second axis comprising a plurality of second variables. The processing unit generates a plurality of points arranged in a matrix based on the first variables and the second variables, each of the points define a value of a property of a material formed by a combination of one of the first variables and one of the second variables. An output device displays a visual representation of the respective values of the property of the material at least two of the plurality of (Continued)

points in a range of indicia. The range of indicia represents a comparison of the respective value of the property and a constraint.

14 Claims, 21 Drawing Sheets

(51) Int. Cl.
 *G06Q 10/06* (2023.01)
 *G06F 3/04847* (2022.01)
(58) Field of Classification Search
 CPC .............. G06F 2111/08; G06F 2111/02; G06F 3/04812; G06T 11/206; G06T 15/00; G06T 17/00; G06T 19/20; G06T 2200/04; G06T 15/83; H04L 67/01; G06Q 30/0283; G06Q 10/06; G06Q 50/02; G06Q 10/087; E21B 49/087; G16H 40/63; G05B 23/02; Y10S 715/97; A61B 34/10; B29B 7/728; B29B 7/007
 See application file for complete search history.

(56) References Cited

U.S. PATENT DOCUMENTS

| | | | | |
|---|---|---|---|---|
| 8,548,778 | B1* | 10/2013 | Hart | A61B 5/0263 600/419 |
| 9,279,897 | B2* | 3/2016 | Zuercher | G01V 1/32 |
| 2001/0048444 | A1* | 12/2001 | Hurley | G06T 15/83 345/589 |
| 2003/0106740 | A1* | 6/2003 | Tabata | H04R 31/006 181/171 |
| 2003/0171877 | A1* | 9/2003 | Adedeji | B29B 7/728 702/27 |
| 2006/0119622 | A1* | 6/2006 | Kariathungal | G16H 40/63 345/653 |
| 2010/0041788 | A1* | 2/2010 | Voigts | A61K 47/38 523/113 |
| 2015/0274587 | A1* | 10/2015 | Barthelat | C03C 23/0025 65/102 |
| 2016/0063146 | A1* | 3/2016 | Bailey | E21B 49/087 703/2 |
| 2017/0022808 | A1* | 1/2017 | Busetti | G01V 99/005 |
| 2017/0286457 | A1* | 10/2017 | Natarajan | G06F 16/248 |
| 2019/0278878 | A1* | 9/2019 | Sawyer | G06F 21/602 |
| 2020/0210056 | A1* | 7/2020 | Steppan | G06T 11/206 |
| 2021/0097211 | A1 | 4/2021 | Beck et al. | |

FOREIGN PATENT DOCUMENTS

| | | | | |
|---|---|---|---|---|
| BR | PI0112341 B1 | * | 11/2015 | |
| CA | 2382752 C | * | 1/2009 | ............ G01N 22/00 |
| CA | 2863626 A1 | * | 8/2013 | ............ B82Y 20/00 |
| CA | 3104767 A1 | * | 1/2020 | ............ C09K 8/426 |
| CN | 109023596 A | * | 12/2018 | ............ D01G 13/00 |
| FR | 3032526 A1 | * | 8/2016 | ........ G01N 15/0826 |
| TW | 201102839 A | * | 1/2011 | ............ G06F 17/50 |
| TW | 201215881 A | * | 4/2012 | ............ G01J 5/0066 |
| WO | WO-2012177108 A2 | * | 12/2012 | ............... G06N 3/12 |
| WO | 2020086395 A1 | | 4/2020 | |

OTHER PUBLICATIONS

Methoden der organischen Chemie (Houben-Weyl, supplemental volumes to the 4th edition, vol. E20, H. Bartl and J. Falbe, Stuttgart, New York, Thieme 1987, pp. 1671-1682).

* cited by examiner

FIG. 2A

Please update/insert the performance data for the polyol/iso mixture of Bayhydrol A 2542 and Bayhydur 305 (LS 2336).

- Dry Time (hr):
- Shelf Life:
- Pendulum Hardness- 1d (s):
- Pendulum Hardness- 7d (s):
- IPA Resistance:
- Water Resistance:
- Gasoline Resistance:
- Skydrol Resistance:
- Acetic Acid 10perc Resistance:
- Brake Fluid Resistance:
- NaOH 25perc Resistance:
- Gloss 20:
- Gloss 60:

- Gloss 80:
- Viscosity (cps):
- Taber Abrasion (mg):
- Adhesion to Al:
- Adhesion to B1000:
- Adhesion to B952:
- Brush Test:
- Haze:
- Solids (%):
- VOC (g/L):
- Roll:
- DOI:

Submit new property data.

BAYHYDROL
145 (CG)
2058 (LR)
2227/1 (MJ)
2470 (CK)
2542 (CK)
2546 (IY)
2601 (CG)
2646 (KH)
2651 (IY)
2695 (LR)
2770 (IY)
U2755 (MM)
2845XP (MM)
2846XP (CK)

2700  7165

Please update/insert the performance data for the polyol/iso mixture of Bayhydrol A 2542 and Bayhydur 305 (LS 2336).

Dry Time (hr): 4.6f

*Please enter numbers and decimals only.*

Shelf Life: ---
Pendulum Hardness- 1d (s):
Pendulum Hardness- 7d (s):
IPA Resistance: ---
Water Resistance: ---

Gloss 80:
Viscosity (cps):
Taber Abrasion (mg):
Adhesion to Al: ---
Adhesion to B1000: ---
Adhesion to B952: ---

FIG. 2B

Please update/insert the performance data for the polyol/iso mixture of Bayhydrol A 2542 and Bayhydur 305 (LS 2336).

Dry Time (hr): 4.6f

Comment:
This is a comment for dry time.

Gloss 80:

Shelf Life: ---

Viscosity (cps):

Pendulum Hardness - 1d (s): ▶

Taber Abrasion (mg):

Pendulum Hardness - 7d (s): ▶

Adhesion to Al: ---

IPA Resistance: ▶

Adhesion to B1000: ---

Please update/insert the performance data for the
polyol/iso mixture of Bayhydrol A 2542 and Bayhydur 305 (LS 2336).

| | | | |
|---|---|---|---|
| Dry Time (hr): | 4.60000 | Gloss 80: | |
| Shelf Life: | -- | Viscosity (cps): | |
| Pendulum Hardness- 1d (s): | | Taber Abrasion (mg): | 43 |
| Pendulum Hardness- 7d (s): | | Adhesion to Al: | -- |
| IPA Resistance: | 3 -No Effect | Adhesion to B1000: | -- |
| Water Resistance: | 3 -No Effect | Adhesion to B952: | -- |
| Gasoline Resistance: | -- | Brush Test: | |
| Skydrol Resistance: | 1 -Strain/Softening | Haze: | |
| Acetic Acid 10perc Resistance: | -- | Solids (%): | |
| Brake Fluid Resistance: | -- | VOC (g/L): | |
| NaOH 25perc Resistance: | -- | Roll: | -- |
| Gloss 20: | | DOI: | |
| Gloss 60: | | | |

Submit new property data. —220

*The property data was successfully added to the database.*

FIG. 2F

| | Bayhydur 302 | Bayhydur 303 | Bayhydur 304 (VP LS 2319) | Bayhydur 305 (LS 2336) | Bayhydur 40170 (LS 2150/1) | Bayhydur quix 306-70 | Bayhydur XP 2451/1 | Bayhydur XP 2487/1 | Bayhydur XP 2457 | Bayhydur XP 2655 | Bayhydur XP 2700 | Bayhydur XP 7165 |
|---|---|---|---|---|---|---|---|---|---|---|---|---|
| Bayhydrol A 145 | 24/24 | 0/24 | 24/24 | 24/24 | 24/24 | 24/24 | 24/24 | 24/24 | 24/24 | 24/24 | 24/24 | 24/24 |
| Bayhydrol A 2058 | 24/24 | 24/24 | 24/24 | 24/24 | 24/24 | 24/24 | 24/24 | 24/24 | 24/24 | 24/24 | 24/24 | 24/24 |
| Bayhydrol A 2227/1 | 24/24 | 24/24 | 24/24 | 24/24 | 24/24 | 24/24 | 24/24 | 24/24 | 24/24 | 24/24 | 24/24 | 24/24 |
| Bayhydrol A 2470 | 24/24 | 0/24 | 24/24 | 24/24 | 24/24 | 24/24 | 24/24 | 24/24 | 24/24 | 24/24 | 24/24 | 24/24 |
| Bayhydrol A 2542 | 24/24 | 0/24 | 24/24 | 24/24 | 24/24 | 24/24 | 0/24 | 24/24 | 24/24 | 24/24 | 24/24 | 24/24 |
| Bayhydrol A 2546 | 24/24 | 0/24 | 24/24 | 24/24 | 24/24 | 24/24 | 24/24 | 24/24 | 24/24 | 24/24 | 24/24 | 24/24 |
| Bayhydrol A 2601 | 24/24 | 24/24 | 24/24 | 24/24 | 24/24 | 24/24 | 24/24 | 24/24 | 24/24 | 24/24 | 24/24 | 24/24 |
| Bayhydrol A 2646 | 24/24 | 0/24 | 24/24 | 24/24 | 24/24 | 24/24 | 24/24 | 24/24 | 24/24 | 24/24 | 24/24 | 24/24 |
| Bayhydrol A 2651 | 24/24 | 0/24 | 24/24 | 24/24 | 24/24 | 24/24 | 24/24 | 24/24 | 24/24 | 24/24 | 24/24 | 24/24 |
| Bayhydrol A 2770 | 24/24 | 0/24 | 24/24 | 24/24 | 24/24 | 24/24 | 24/24 | 24/24 | 24/24 | 24/24 | 24/24 | 24/24 |
| Bayhydrol A 2845 | 24/24 | 0/24 | 24/24 | 24/24 | 0/24 | 0/24 | 24/24 | 24/24 | 0/24 | 24/24 | 24/24 | 24/24 |
| Bayhydrol A 2846 XP | 24/24 | 0/24 | 24/24 | 24/24 | 24/24 | 24/24 | 24/24 | 24/24 | 24/24 | 24/24 | 24/24 | 24/24 |
| Bayhydrol A XP 2695 | 24/24 | 24/24 | 24/24 | 24/24 | 24/24 | 24/24 | 24/24 | 24/24 | 24/24 | 24/24 | 24/24 | 24/24 |

Bayhydrol A Products:
- Bayhydrol A145
- Bayhydrol A2058
- Bayhydrol A2227/1
- Bayhydrol A2470
- Bayhydrol A2542

Bayhydur Products:
- Bayhydur 302
- Bayhydur 303
- Bayhydur 304(VP LS 2319)
- Bayhydur 305(LS 2336)
- Bayhydur 40170(LS 2150/1)

- ☑ Dry Time (hr)
- ☑ Gloss 60
- ☑ Shelf Life
- ☑ Gloss 85
- ☑ Pendulum Hardness-1d(s)
- ☑ Viscosity (cps)
- ☑ Pendulum Hardness-7d(s)
- ☑ Taber Abrasion (mg)
- ☑ IPA Resistance
- ☑ Adhesion to Al
- ☑ Water Resistance
- ☑ Adhesion to B1000
- ☑ Gasoline Resistance
- ☑ Adhesion to B952
- ☑ Skydrol Resistance
- ☑ Compatibility
- ☑ Acetic Acid 10perc Resistance
- ☑ Haze:
- ☑ Brake Fluid Resistance
- ☑ Solids (%)
- ☑ NaOH 25perc Resistance
- ☑ VOC (g/L)
- ☑ Gloss 20
- ☑ DOI

FIG. 4A

| | Bayhydur 303 | Bayhydur 304 (VP LS 2319) | Bayhydur 305 (LS 2336) | Bayhydur 401 70(LS 2150/1) | Bayhydur quix 306-70 | Bayhydur XP 2451/1 |
|---|---|---|---|---|---|---|
| Bayhydrol A 2227/1 | 24/24 | 24/24 | 24/24 | 24/24 | 24/24 | 24/24 |
| Bayhydrol A 2470 | 0/24 | 24/24 | 24/24 | 24/24 | 24/24 | 0/24 |
| Bayhydrol A 2542 | 0/24 | 24/24 | 24/24 | 24/24 | 24/24 | 24/24 |
| Bayhydrol A 2546 | 0/24 | 24/24 | 24/24 | 24/24 | 24/24 | 24/24 |
| Bayhydrol A 2601 | 24/24 | 24/24 | 24/24 | 24/24 | 24/24 | 24/24 |

Bayhydrol A Products:
- Bayhydrol A145
- Bayhydrol A2058
- Bayhydrol A2227/1
- Bayhydrol A2470
- Bayhydrol A2542

Bayhydur Products:
- Bayhydur 302
- Bayhydur 303
- Bayhydur 304(VP LS 2319)
- Bayhydur 305(LS 2336)
- Bayhydur 40170(LS 2150/

- ☑ Dry Time (hr)
- ☑ Shelf Life
- ☑ Pendulum Hardness-1d(s)
- ☑ Pendulum Hardness-7d(s)
- ☑ IPA Resistance
- ☑ Gloss 60
- ☑ Gloss 85
- ☑ Viscosity (cps)
- ☑ Taber Abrasion (mg)
- ☑ Adhesion to Al

FIG. 4B

| | Bayhydur 302 | Bayhydur 303 | Bayhydur 304 (VP LS 2319) | Bayhydur 305 (LS 2336) | Bayhydur 401 70(LS 2150/1) | Bayhydur quix 306-70 | Bayhydur XP 2451/1 | Bayhydur XP 2487/1 | Bayhydur XP 2457 | Bayhydur XP 2655 |
|---|---|---|---|---|---|---|---|---|---|---|
| Bayhydrol A 145 | 24/24 | 0/24 | 24/24 | 24/24 | 24/24 | 24/24 | 24/24 | 24/24 | 24/24 | 24/24 |
| Bayhydrol A 2058 | 24/24 | 24/24 | 24/24 | 24/24 | 24/24 | 24/24 | 24/24 | 24/24 | 24/24 | 24/24 |
| Bayhydrol A 2227/1 | 24/24 | 24/24 | 24/24 | 24/24 | 24/24 | 24/24 | 24/24 | 24/24 | 24/24 | 24/24 |
| Bayhydrol A 2470 | 24/24 | 0/24 | 24/24 | 24/24 | 24/24 | 24/24 | 24/24 | 24/24 | 24/24 | 24/24 |
| Bayhydrol A 2542 | 24/24 | 0/24 | 24/24 | 24/24 | 24/24 | 24/24 | 0/24 | 24/24 | 24/24 | 24/24 |
| Bayhydrol A 2546 | 24/24 | 0/24 | 24/24 | 24/24 | 24/24 | 24/24 | 24/24 | 24/24 | 24/24 | 24/24 |
| Bayhydrol A 2601 | 24/24 | 24/24 | 24/24 | 24/24 | 24/24 | 24/24 | 24/24 | 24/24 | 24/24 | 24/24 |
| Bayhydrol A 2646 | 24/24 | 0/24 | 24/24 | 24/24 | 24/24 | 24/24 | 24/24 | 24/24 | 24/24 | 24/24 |
| Bayhydrol A 2651 | 24/24 | 0/24 | 24/24 | 24/24 | 24/24 | 24/24 | 24/24 | 24/24 | 24/24 | 24/24 |
| Bayhydrol A 2770 | 24/24 | 0/24 | 24/24 | 24/24 | 24/24 | 24/24 | 24/24 | 24/24 | 24/24 | 24/24 |
| Bayhydrol A 2845 | 24/24 | 0/24 | 24/24 | 24/24 | 0/24 | 0/24 | 24/24 | 24/24 | 24/24 | 24/24 |
| Bayhydrol A 2846 XP | 24/24 | 0/24 | 24/24 | 24/24 | 24/24 | 24/24 | 24/24 | 24/24 | 0/24 | 24/24 |

FIG. 5

Property Matches for
Bayhydrol A 2470 and Bayhydur 304 (VP LS 2319)

Matched Properties

- ⊘ Acetic Acid 10perc Resistance: 1 - Stain/Softening
- ⊘ Adhesion to B952: 5B: none
- ⊘ Brake Fluid Resistance: 1 - Stain/Softening
- ⊘ Compatibility: yellow
- ⊘ DOI: 50
- ⊘ Dry Time: 5
- ⊘ Gloss 20: 55
- ⊘ Gloss 60: 81
- ⊘ Gloss 85: 100
- ⊘ Haze: 16
- ⊘ NaOH 25perc Resistance: 3 - No Effect
- ⊘ Shelf Life: red
- ⊘ Skydrol Resistance: 1 - Stain/Softening
- ⊘ Solids: 45
- ⊘ Taber Abrasion: 110
- ⊘ Viscosity: 35
- ⊘ VOC: 150

Unmatched Properties

- ⊗ Adhesion to Al: 5B: none
- ⊗ Adhesion to B1000: 5B: none
- ⊗ Gasoline Resistance: 1 - Stain/Softening
- ⊗ IPA Resistance: 2 - Slight Effect (staining/softening)
- ⊗ Pendulum Hardness - 1d: 62
- ⊗ Pendulum Hardness - 7d: 154
- ⊗ Water Resistance: 1 - Stain/Softening

Waterborne Soft Touch Polyurethane Plastic Coating
Feel Starting Point Formulation This information comes without any warranty or guarentee of any kind. Use at your own risk. See full disclaimer and use information at the end of the document.

NOTE: This formulation was derived from statiscally significant data and represents what we believe to be valid predictions of both haptic and coating perfomance parameters. Actual formulation testing may not have been completed for every generated combination.

Description
The following formulation is a 2K Waterborne Soft Touch Polyurethane Black Coating designed for plastic substrates, such as automotive interior parts or consumer electronic devices. The cured coating has a Semi gloss, hard feel as well as excellent abrasion and good chemical resistance.

Key Features
- Semi gloss
- Excellent abrasion, good chemical, and good scratch resistance
- VOC (2.70 lbs/gal) (323.01 g/L) calculated Suggested Uses
- Rigid automotive interior plastic parts
- Consumer plastic parts

Formulation and Raw Material Detail

| Raw Material | Weight (lb) | Volume (gal) | Function | Supplier |
|---|---|---|---|---|
| Component #1 | | | | |
| Bayhydrol UH 340/1 | 6.00 | 0.65 | Resin Binder | Covestro |
| Bayhydrol U 2757 | 7.00 | 0.78 | Resin Binder | Covestro |
| Bayhydrol A XP 2695 | 87.00 | 9.78 | Resin Binder | Covestro |
| BYK -346 | 2.01 | 0.24 | Flow Additive | BYK-Chemie USA |
| Water, DI | 65.45 | 7.84 | Diluent | |
| Butyl carbitol | 16.92 | 2.13 | Co-solvent | Dow |
| ACEMATT OK -412 | 12.47 | 0.79 | Matting Agent | Evonik Industries |
| Tego Foamex 805 | 1.09 | 0.13 | Defoamer | Evonik Industries |
| Subtotal #1: | 197.96 | 22.35 | | |
| Component #2: | | | | |
| Bayhydur 302* | 24.14 | 2.72 | Crosslinker | Covestro |
| Bayhydur 2487/1* | 24.14 | 2.68 | Crosslinker | Covestro |
| Subtotal #2: | 48.29 | 5.40 | | |
| Optional Dilution | | | | |
| Water, DI | 21.82 | 2.61 | Diluent | |
| Subtotal #3: | 21.82 | 2.61 | | |
| TOTAL: | 268.07 | 30.36 | | |

\* Bayhydur 302 (75% in n-BA/Mineral Spirits 7:3)
Bayhydur 248/1 (75% in Proglyde DMM)

| Theoretical Results | | | |
|---|---|---|---|
| Weight Solids (%) | 34.29 | Density (lb/gal) | 8.83 |
| Volume Solids (%) | 29.05 | Mix Ratio (Volume) | 4.14 : 1.00 : 0.48 |
| Pigment to Binder Ratio | 0.16 | NCO:OH | 1.50 |
| PVC (%) | 9.10 | Theoretical VOC (lb/gal) | 2.70 |

Mixing Instructions

Using a high speed dissolver, with milling media, add ingredients in the order listed above. Mill until a Hegman 6 - 7 is achieved. Keep millbase temperature below 140°F (60°C). Check volume solids and adjust as required with DI Water.

- Important: Component #1 should be aged for 24 hours before application.
- The solids of the formulation can be increased or decreased by removing or adding Water. Co-solvents, such as glycol ethers, Proglyde DMM or butyl carbitol, can be added to improve film formation properties.
- To discuss the robustness and adjustments of Covestro designed products to your specific needs, contact 412-413-3983 or email CAS.NA@covestro.com.

Application and Cure Parameters
- Important: Addition of the hardener (Component #2) should be done under agitation prior to application. Caution should be used to prevent excessive air from being induced into the mixture.
- No induction time is required
- Standard spray equipment is recommended, such as conventional air or HVLP:
  - 1.4 nozzle-Xtreme air cap
  - 100 PSI line pressure at the wall
  - Regualted inlet air of 18 PSI
  - 200 micron in-line air filter is to remove contaminates from supply air
- Flash the coating for 60 minutes at 73°F (23°C) prior to curing in an oven at 176°F (80°C) for 60 minutes.
- A period of 7 days is allowed to lapse prior to testing dry film properties.
- The coating can be applied directly to polycarbonate T-85 substrates for testing or display.
- Application to other plastics, surface treatments or primers, will need to be tested.
- The recommended film thickness is 1.0-2.0 mils (25.4-50.8 um) DFT. Lower film thickness can impact the perception of softness.

Trouble Shooting

Fish-eyes can occur during application if additives are not sufficiently incorporated. Increasing the sheer speed or viscosity of the millbase will often correct this problem.

Insufficient flashing of the coating prior to baking will result in solvent popping. The majority of the solvent is Water and flash time will be dependent on ambient humidity. Flashing the panels in the spray booth can help reduce flash time.

Performance Data

| Test Properties | | |
|---|---|---|
| Test | Procedure | Results |
| Pot Life (minutes) | Covestro Internal Test Procedure | 30.00 |
| Feel Rating | Covestro Internal Test Procedure | Hard |
| Haptic Map Rating | Covestro Internal Test Procedure | 4 |
| 5 - Finger Scratch | GMN3943 | 3 |
| Linear Abrasion | Covestro Internal Test Procedure | 2.1 |
| DEET / Sunscreen Resistance | GMW 14445 | 2 |
| Chemical Spot Testing (4 hr uncovered) | ASTM D - 1308 | |
| Coffee | | No Effect |
| IPA | | No Effect |
| MEK Double Rub (strokes/min) | Covestro Internal Test Procedure | 99 |
| Coefficient of Friction | Covestro Internal Test Procedure | 2.3 |
| Glass (60') | ASTM D523 - 14 | 78.0 |

| Term Description Key | | |
|---|---|---|
| Term | Value Meaning | Recommendation |
| Mix Ratio | Ratio of volume of Component #1 to volume of Component #2 | As desired |
| PVC | Concentration of pigment volume solid per total resin volume solid | As desired |
| Soft Feel Rating | 1 = Rubbery<br>2 = Velvety<br>3 = Silky<br>4 = Hard | As desired |
| 5 - Finger Scratch | 1 - 1.5 = No Effect<br>1.5 - 4 = Slight Scratch<br>4 - 5 = Scratch to Substrate | Higher is better |
| Linear Abrasion | 1 = No Effect<br>2 = Slight Downglossing<br>3 = Some Coating Abrasion<br>4 = Some Coating Damage<br>5 = Abrasion to Substrate | Lower is better (≤2 is best) |
| DEET | 1 = Good<br>2 = Slight Staining<br>3 = Slight Blistering<br>4 = Bad | Lower is better (≤2 is best) |
| MEK Double Rub | # = Number of rubs that left a mark<br>No Effect = sample withstood over 100 rubs without a mark | Higher is better |
| Glass (60') | 0-20 = Matte<br>21-35 Satin Gloss<br>36-70 = Semi-Gloss<br>70-100 = High Gloss | As desired |
| Drag | 1 - 3 = Smooth / Slippery<br>3 - 4 = Uneven / Texture<br>4 - 6 = Rough / Sticky | As desired |

FIG. 7C

METHODS FOR GRAPHICAL DEPICTION OF A VALUE OF A PROPERTY OF A MATERIAL

CROSS-REFERENCE TO RELATED APPLICATIONS

This application is a national stage application under 35 U.S.C. 371 of PCT/US2020/039077, filed Jun. 23, 2020, which claims the benefit of U.S. Provisional Application Ser. No. 62/868,227, filed Jun. 28, 2019, each of which is incorporated herein by reference.

TECHNICAL FIELD

The present disclosure relates to methods for graphical depiction of a value of a property of a material.

BACKGROUND

The information described in this background section is not admitted to be prior art.

Users may have to select product configurations tailored to their unique application needs. This task can be complicated when there are tens or even hundreds of possible product configurations, and multiple variables which must be taken into account. Thus, there exists a need for graphical depictions, and methods to display them, to assist users in making such a selection.

SUMMARY

In an aspect, a method of producing a graphical depiction of a value of a property of a material is provided. The method comprises generating, by a processing unit, a plot defining a geometric shape, a first axis comprising a plurality of first variables, and a second axis comprising a plurality of second variables. The processing unit generates a plurality of points arranged in a matrix based on the first variables and the second variables, each of the points define a value of a property of a material formed by a combination of one of the first variables and one of the second variables. An output device displays a visual representation of the respective values of the property of the material at at least two of the plurality of points in a range of indicia. The range of indicia represents a comparison of the respective value of the property and a constraint.

In another aspect, a method of producing a graphical depiction of a value of a property of a material is provided. The method comprises generating, by a processing unit, a plot defining a geometric shape, a first axis comprising a plurality of first variables, and a second axis comprising a plurality of second variables. Each first variable represents a different first component and each second variable represents a different second component. An output device displays the plot including the first variables as headers in a plurality of columns and the second variables as headers in a plurality of rows. The processing unit generates a plurality of points arranged in a matrix based on the first variables and the second variables. Each of the points defines values of a property of a material formed at an intersection of one of columns and one of rows. The output device displays a visual color heat map of the respective values of the property of the material at at least two of the plurality of points in a range of colors. The range of colors represents a comparison of the respective value of the property and the at least two constraints. The output device displays a slider or listbox representing each constraint.

It is understood that the contents of this specification is not limited to the examples summarized in this Summary. The reader will appreciate the foregoing details, as well as others, upon considering the following detailed description of various non-limiting and non-exhaustive examples according to this specification.

DRAWINGS

The features and advantages of the examples, and the manner of attaining them, will become more apparent, and the examples will be better understood, by reference to the following description taken in conjunction with the accompanying drawings, wherein:

FIG. 2A is an example of a graphical depiction of a secondary window overlaying a plot according to the present disclosure in a data entry mode;

FIG. 2B is an example of a portion of the secondary window of FIG. 2A illustrating feedback based on a value in an input element;

FIG. 2C is an example of a portion of the secondary window of FIG. 2A illustrating a comment input element;

FIG. 2F is an example of the secondary window of FIG. 2A illustrating a click of a button to store values from the input elements in the database;

FIG. 4A is an example of a visual representation of the respective values of the properties of the material compared to the constraints at various points according to the present disclosure in a data explorer mode;

FIG. 4B is an example of an updated visual representation of FIG. 4A after interaction with the graphical representations of the first and second variables;

FIG. 5 is an updated visual representation of FIG. 4A after interaction with the graphical representation of the constraints;

FIG. 6 is an example of a graphical depiction of a secondary window generated based on interaction with the visual representation of FIG. 5;

Figure 8:
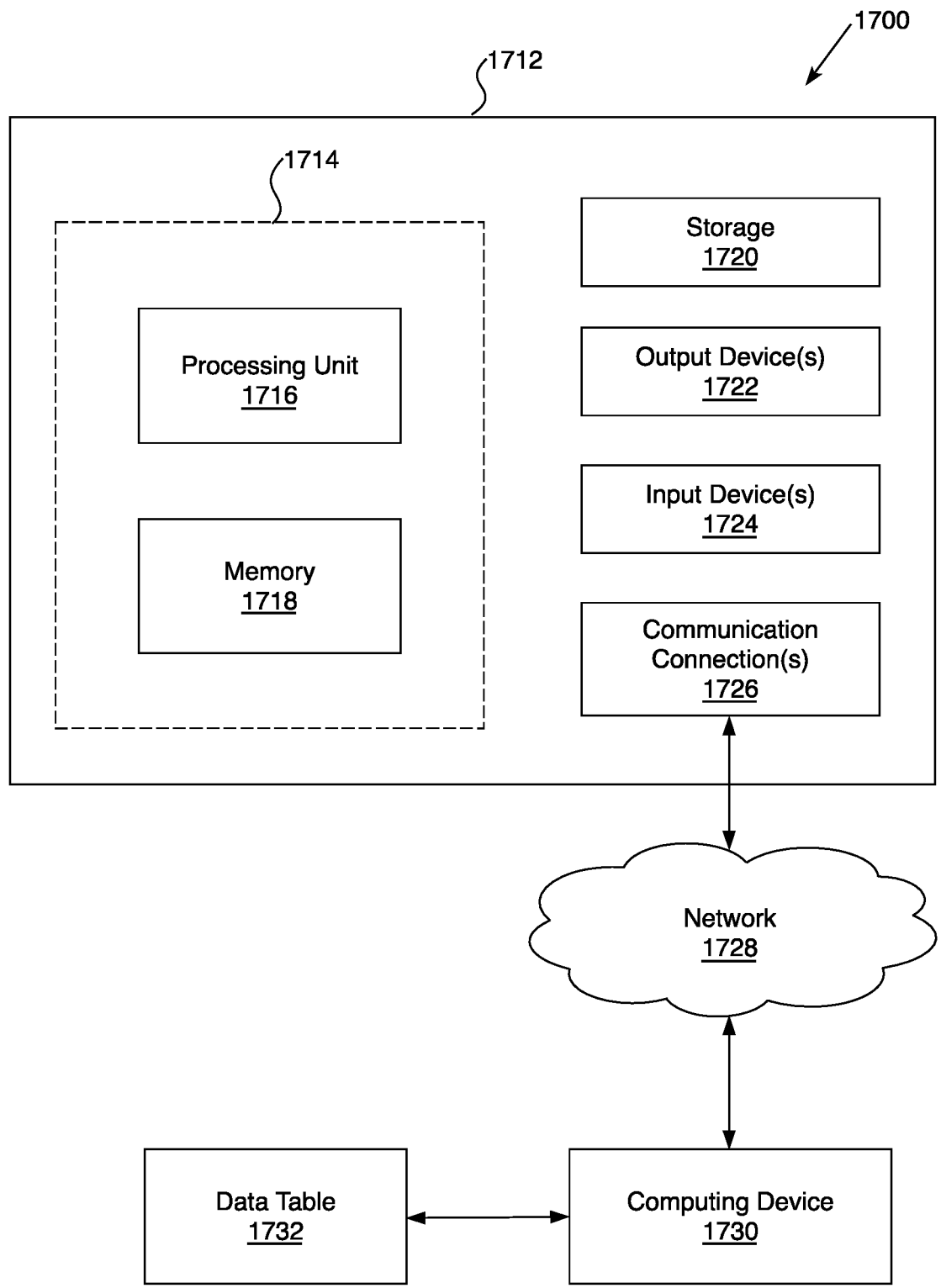
Figure 9:
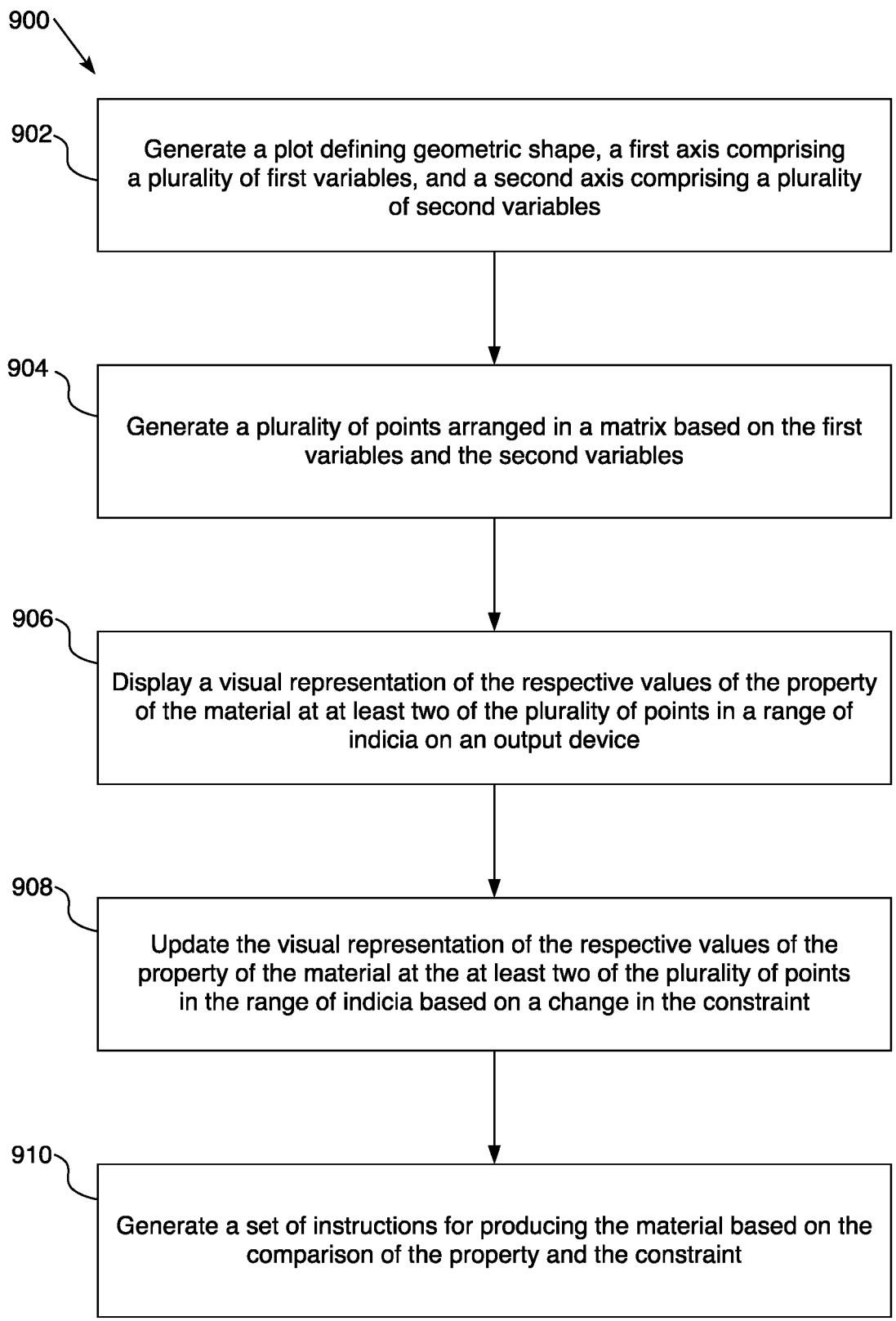
Figure 10A:
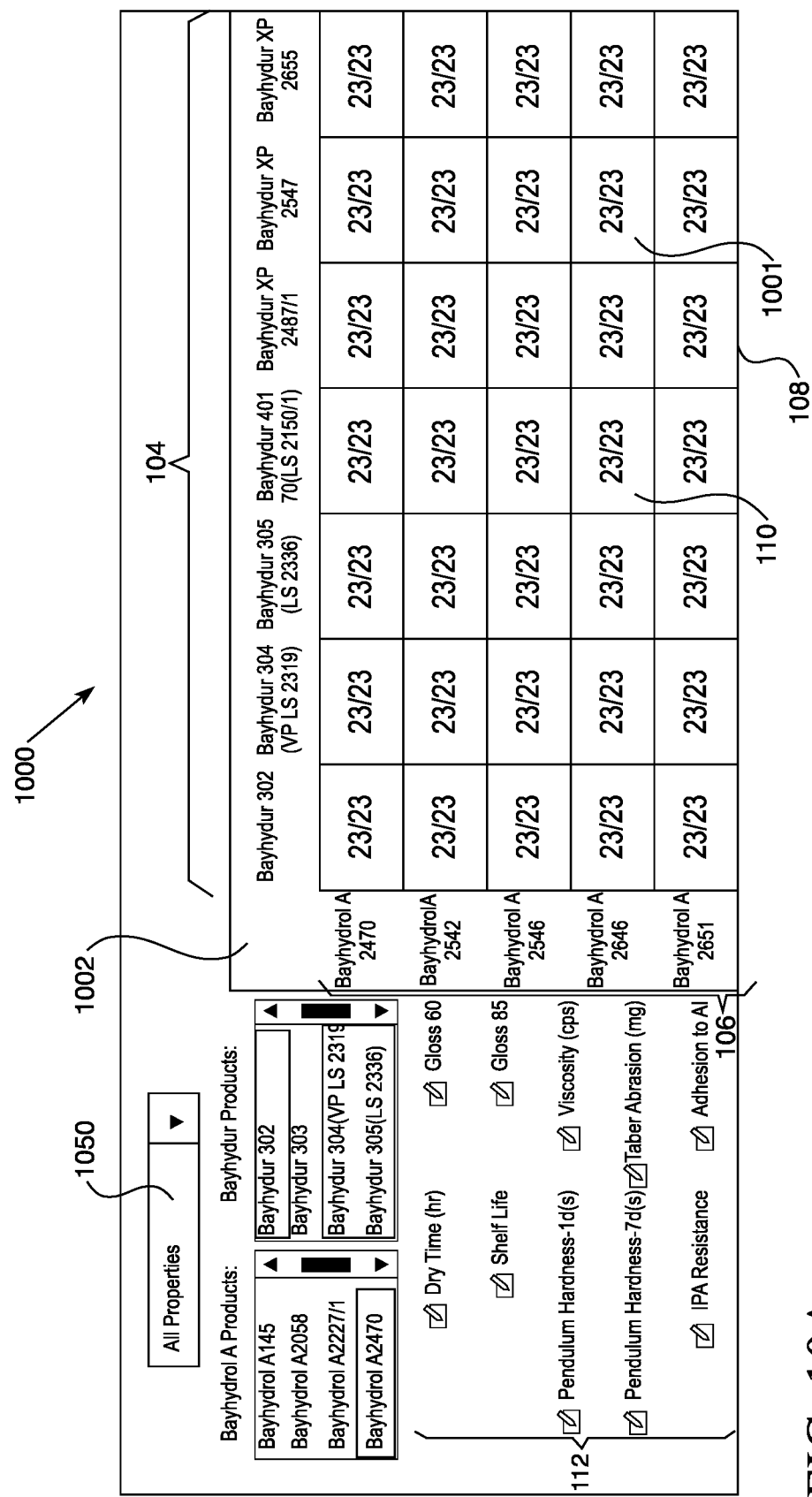
Figure 10B:
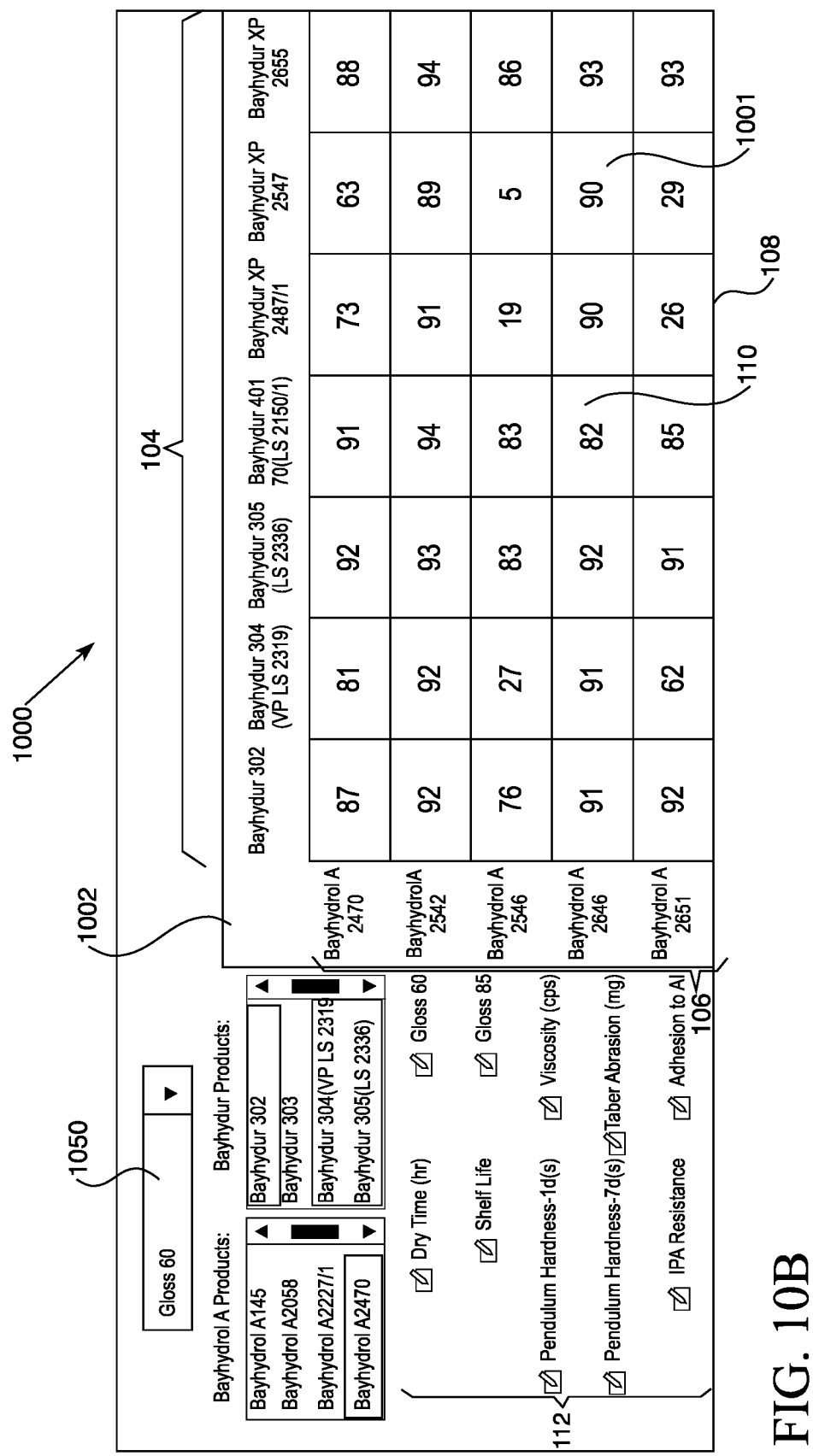
Figure 10C:
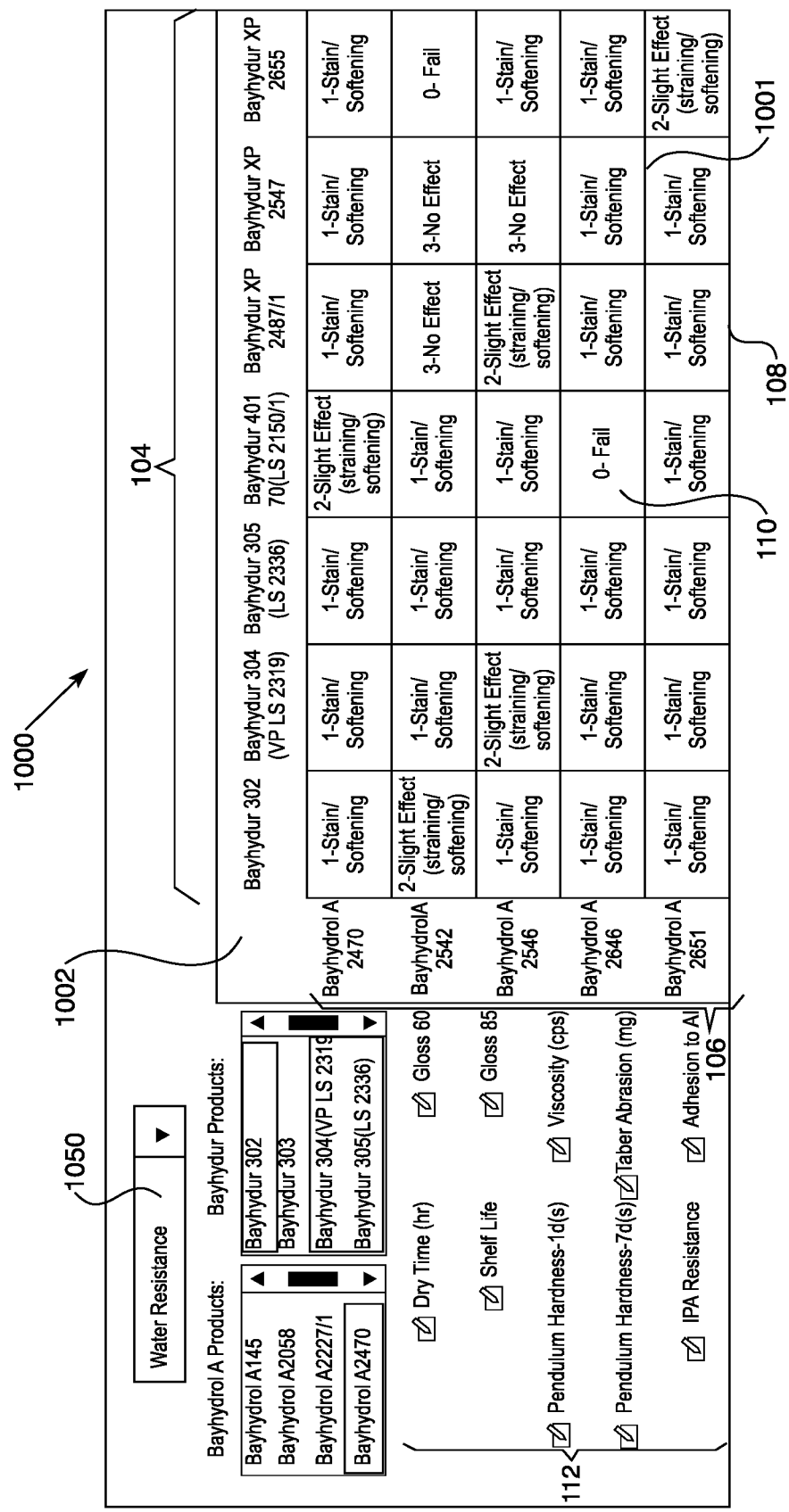

FIGS. 7A-C are examples of a graphical representation of a set of instructions for producing a desired material;

FIG. 8 is an example of a computing environment wherein the provisions set forth herein may be implemented;

FIG. 9 is a logic flow diagram of an example of a logic configuration or process of a method of producing a graphical depiction of a value of a property of a material according to the present disclosure;

FIG. 10A is an example of a visual representation of the respective values of the properties of the material compared to the constraints at various points according to the present disclosure in a data explorer mode;

FIG. 10B is a first example of an updated visual representation of FIG. 10A after interaction with the graphical representations of the properties; and FIG. 10C is a second example of an updated visual representation of FIG. 10A after interaction with the graphical representations of the properties.

Corresponding reference characters indicate corresponding parts throughout the several views. The exemplifications set out herein illustrate certain embodiments, in one form, and such exemplifications are not to be construed as limiting the scope of the appended claims in any manner.

DESCRIPTION

Various examples are described and illustrated herein to provide an overall understanding of the structure, function, and use of the disclosed articles and methods. The various examples described and illustrated herein are non-limiting and non-exhaustive. Thus, various aspects of this disclosure are not limited by the description of the various non-limiting and non-exhaustive examples disclosed herein. Rather, the various aspects of this disclosure are defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various example," "some examples," "one example," "an example," or like phrases mean that a particular feature, structure, or characteristic described in connection with the example is included in one example or two or more examples. Thus, appearances of the phrases "in various examples," "in some examples," "in one examples," "in an examples," or like phrases in the specification do not necessarily refer to the same examples. Furthermore, the particular described features, structures, or characteristics may be combined in any suitable manner in one example or two or more examples. Thus, the particular features, structures, or characteristics illustrated or described in connection with one example may be combined, in whole or in part, with the features, structures, or characteristics of other examples without limitation. Such modifications and variations are intended to be included within the scope of the present examples.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

There are challenges with determining which material configurations meet the requirements of their unique application. For example, a user may have difficultly determining which materials comprise properties with values that are tailored to their unique application. In some examples, the present disclosure is directed to a client-server based visualization mapping techniques that employs graphical user interfaces (GUIs) configured to enable users to custom-design material configurations tailored to their unique application needs. A graphical depiction of a value of a property of a material according to the present disclosure may be defined for a variety of products to reduce development time and provide self-service formulation assistance.

As provided herein, a method of producing a graphical depiction of a value of a property of a material comprises generating, by a processing unit, a plot defining a geometric shape, a first axis comprising a plurality of first variables, and a second axis comprising a plurality of second variables. The processing unit generates a plurality of points arranged in a matrix based on the first variables and the second variables, each of the points define a value of a property of a material formed by a combination of one of the first variables and one of the second variables. An output device displays a visual representation of the respective values of the property of the material at at least two of the plurality of points in a range of indicia. The range of indicia represents a comparison of the respective value of the property and a constraint.

The visual representation according to the present disclosure can provide a fast, low cost solution to assist users in better understanding available materials. The structure of the visual representation according to the present disclosure can be universal, in that it can be customized to a user's desires and may be dynamic to visually indicate the values of properties of any type of material. The visual representation according to the present disclosure can enable a rapid selection of a material that is suitable to the user's application.

The graphical depiction of a value of a property of a material according to the present disclosure can be operated in any HTML5 compliant browser and may be created using web visualization software. The graphical depiction of a value of a property according to the present disclosure may be published to the cloud and may be made available to users via a website. Accordingly, the graphical depiction of a value of a property of a material according to the present disclosure can be use on modern cell phones, tablets, and personal computers.

The graphical depiction of a value of a property according to the present disclosure can be a user-friendly interface that may be made available for self-service 24 hours per day and 7 days per week. Calculations conducted by the graphical depiction of a value of a property of a material according to the present disclosure can be performed "behind" the face of the graphical depiction to protect the data at each point in the matrix, data used to build the models, and/or to prevent the user from accidentally causing damage to the functionality of the graphical depiction of a value of a property according to the present disclosure. The graphical depiction of a value of a property according to the present disclosure can enable users to interact with a relational database through graphical icons and visual indicators, instead of text-based user interfaces, typed command labels or text navigation.

The graphical depiction of a value of a property of a material according to the present disclosure may require unique username and password access to use. For example, a login page can serves as a gateway to accessing the graphical depiction of a value of a property of a material according to the present disclosure. Once a user has been granted access to utilize the graphical depiction, he/she will enter the assigned username and password into the provided entry boxes. Once a user has signed in, the home screen provides a tab or other selectable item that the user may select to open the graphical depiction of a value of a property of a material according to the present disclosure. In some examples, the graphical depiction of a value of a property of a material according to the present disclosure allows a user to design products using resins, or other products, based on properties of interest as discussed below.

In various examples, a hash system can be used where each user gets a unique uniform resource locator (URL) that can grant the user access to the graphical depiction of a value of a property of a material according to the present disclosure. In various examples, the URL may be valid for a designated time period and after the designated period of time, the user can receive a new URL in order to access that graphical depiction of a value of a property of a material for a second period of time. The user may renew access and receive additional URLs for access as desired.

A material can comprise a foam, a coating, an adhesive, a sealant, an elastomer, a sheet, a film, a binder, any organic polymer, or combinations thereof. For example, the material can comprise a polyurethane dispersion (PUD). PUDs and methods of making them may be found, for example, in Polyurethanes—Coatings, Adhesives and Sealants, Ulrich Meier-Westhues, Vincentz Network GmbH & Co., KG, Hannover, (2007), Ch. 3, the contents of which are incorporated herein by reference.

Polyurethane dispersions can comprise: (A) at least one diol and/or polyol component (B) at least one di- and/or polyisocyanate component (C) at least one component including at least one hydrophilizing group (D) optionally mono-, di- and/or triamine-functional and/or hydroxylamine-functional compounds, and (E) optionally other isocyanate-reactive compounds.

Coating compositions disclosed herein may be embodied as one-component or two-component compositions. As used herein, the term "two-component" refers to a coating composition comprising at least two reactive components that are stored in separate containers. For example, in examples described herein, component (A) and component (B) can be stored in separate containers. Other ingredients may, of course, be stored with component (A) and/or component (B) or separately from component (A) and component (B). In some examples, component (A) may be a prepolymer or a semi-prepolymer, and component (B) may be a diisocyanate or a polyisocyanate.

Suitable diol- and/or polyol components (A) can be compounds having at least two hydrogen atoms which are reactive with isocyanates and have an average molecular weight of 62 to 18000 g/mol or 62 to 4000 g/mol. Examples of suitable structural components include polyethers, polyesters, polycarbonates, polylactones and polyamides. Polyols (A) can have 2 to 4 hydroxyl groups, 2 to 3 hydroxyl groups, or 2 hydroxyl groups. Mixtures of different such compounds are also possible.

Possible polyester polyols can be linear polyester diols or indeed weakly branched polyester polyols, as can be prepared from aliphatic, cycloaliphatic or aromatic di- or polycarboxylic acids, such as succinic, methylsuccinic, glutaric, adipic, pimelic, suberic, azelaic, sebacic, nonanedicarboxylic, decanedicarboxylic, terephthalic, isophthalic, o-phthalic, tetrahydrophthalic, hexahydrophthalic, cyclohexane dicarboxylic, maleic, fumaric, malonic or trimellitic acid and acid anhydrides, such as o-phthalic, trimellitic or succinic acid anhydride or mixtures thereof with polyhydric alcohols such as ethanediol, di-, tri-, tetraethylene glycol, 1,2-propanediol, di-, tri-, tetrapropylene glycol, 1,3-propanediol, butanediol-1,4, butanediol-1,3, butanediol-2,3, pentanediol-1,5, hexanediol-1,6, 2,2-dimethyl-1,3-propanediol, 1,4-dihydroxycyclohexane, 1,4-dimethylol cyclohexane, octanediol-1,8, decanediol-1,10, dodecanediol-1,12 or mixtures thereof, optionally with the use of higher-functional polyols, such as trimethylol propane, glycerine or pentaerythritol. Cycloaliphatic and/or aromatic di- and polyhydroxyl compounds are also possible as the polyhydric alcohols for preparing the polyester polyols. Instead of free polycarboxylic acid, it is also possible to use the corresponding polycarboxylic acid anhydrides or corresponding polycarboxylic acid esters of low alcohols or mixtures thereof for preparing the polyesters.

The polyester polyols may be homopolymers or mixed polymers of lactones which can be preferably obtained by the addition of lactones or lactone mixtures, such as butyrolactone, ε-caprolactone and/or methyl-ε-caprolactone, to suitable di- and/or higher-functional starter molecules, such as the low-molecular-weight polyhydric alcohols mentioned above as structural components for polyester polyols. The corresponding polymers of ε-caprolactone can be preferred.

Polycarbonates having hydroxyl groups are also possible as the polyhydroxyl components (A), e.g., those which can be prepared by reacting diols such as 1,4-butanediol and/or 1,6-hexanediol with diaryl carbonates, such as diphenyl carbonate, dialkyl carbonates, such as dimethyl carbonate, or phosgene. As a result of the at least partial use of polycarbonates having hydroxyl groups, the resistance of the polyurethane dispersion to hydrolysis can be improved.

Suitable polyether polyols are, for example, the polyaddition products of styrene oxides, ethylene oxide, propylene oxide, tetrahydrofuran, butylene oxide, epichlorohydrine, and mixed addition and grafting products thereof, and the polyether polyols obtained from condensation of polyhydric alcohols or mixtures thereof and from alkoxylation of polyhydric alcohols, amines and amino alcohols. Polyether polyols which are suitable as structural components A) are the homopolymers, mixed polymers and graft polymers of propylene oxide and ethylene oxide which are obtainable by the addition of the said epoxies to low-molecular-weight diols or triols, such as those mentioned above as structural components for polyester polyols, or to higher-functional low-molecular-weight polyols such as pentaerythritol or sugar, or to water.

Other suitable components (A) are low-molecular-weight diols, triols and/or tetraols such as ethanediol, di-, tri-, tetraethylene glycol, 1,2-propanediol, di-, tri-, tetrapropylene glycol, 1,3-propanediol, butanediol-1,4, butanediol-1,3, butanediol-2,3, pentanediol-1,5, hexanediol-1,6, 2,2-dimethyl-1,3-propanediol, 1,4-dihydroxycyclohexane, 1,4-dimethylol cyclohexane, octanediol-1,8, decanediol-1,10, dodecanediol-1,12, neopentyl glycol, 1,4-cyclohexane diol, 1,4-cyclohexane dimethanol, 1,4-, 1,3-, 1,2-dihydroxybenzene or 2,2-bis-(4-hydroxyphenyl)-propane (bisphenol A), TCD-diol, trimethylol propane, glycerine, pentaerythritol, dipentaerythritol or mixtures thereof, optionally also using further diols or triols which are not mentioned.

Suitable polyols can be reaction products of the polyols, in particular low-molecular-weight polyols, with ethylene and/or propylene oxide.

The low-molecular-weight components (A) can have a molecular weight of 62 to 400 g/mol and can be used in combination with the polyester polyols, polylactones, polyethers and/or polycarbonates mentioned above.

In certain examples, the prepolymers and semi-prepolymers of component (A) are prepared from a relatively high molecular weight polyhydroxyl compound having a molecular weight of 300 to 8,000, such as 1,000 to 5,000, as determined from the functionality and the OH number. These polyhydroxyl compounds have at least two hydroxyl groups per molecule and generally have a hydroxyl group content of 0.5% to 17% by weight, such as 1% to 5% by weight.

In certain examples, the polymeric polyol comprises an acrylic polyol, including acrylic polyols that contain acid, such as carboxylic acid, functional groups. Acrylic polyols suitable for use in the waterborne anti-corrosion compositions of the present invention include hydroxyl-containing copolymers of olefinically unsaturated compounds, such as those polymers that have a number average molecular weight (Mn) determined by vapor pressure or membrane osmometry of 800 to 50,000, such as 1,000 to 20,000, or, in some cases, 5,000 to 10,000, and/or having a hydroxyl group content of 0.1 to 12% by weight, such as 1 to 10% by weight and, in some cases, 2 to 6% by weight and/or having an acid value of at least 0.1 mg KOH/g, such as at least 0.5 mg KOH/g and/or up to 10 mg KOH/g or, in some cases, up to 5 mg KOH/g.

Often, the copolymers are based on olefinic monomers containing hydroxyl groups and olefinic monomers which are free from hydroxyl groups. Examples of suitable olefinic monomers that are free of hydroxyl groups include vinyl and vinylidene monomers, such as styrene, methyl styrene, o- and p-chloro styrene, o-, m- and p-methyl styrene, p-tert-butyl styrene; acrylic acid; methacrylic acid; (meth)acrylonitrile; acrylic and methacrylic acid esters of alcohols containing 1 to 8 carbon atoms, such as ethyl acrylate, methyl acrylate, n- and iso-propyl acrylate, n-butyl acrylate, 2-ethylhexyl acrylate, 2-ethylhexyl methacrylate, iso-octyl acrylate, methyl methacrylate, ethyl methacrylate, butyl methacrylate and iso-octyl methacrylate; diesters of fumaric acid, itaconic acid or maleic acid having four to eight carbon atoms in the alcohol component; (meth)acrylic acid amide; and vinyl esters of alkane monocarboxylic acids having two to five carbon atoms, such as vinyl acetate or vinyl propionate.

Examples of suitable olefinic monomers containing hydroxyl groups are hydroxyalkyl esters of acrylic acid or methacrylic acid having two to four carbon atoms in the hydroxyalkyl group, such as 2-hydroxyethyl(meth)acrylate, 2-hydroxypropyl(meth)acrylate, 4-hydroxybutyl(meth)acrylate and trimethylolpropane-mono- or pentaerythritol mono-(meth)acrylate. Mixtures of the monomers exemplified above may also be used for the preparation of the acrylic polyol. As will be appreciated, (meth)acrylate and (meth)acrylic are meant to encompass methacrylate and acrylate or methacrylic and acrylics, as the case may be. Mixtures of the various polymeric polyols described above may be used.

The content of polyol component (A) in the polyurethane according to the present disclosure can be 20 to 95 wt. %, 30 to 90 wt. %, or 65 to 90 wt. %.

Component (B) can be any organic compounds which have at least two free isocyanate groups in each molecule. Diisocyanates $Y(NCO)_2$ can be used, wherein Y represents a divalent aliphatic hydrocarbon radical having 4 to 12 carbon atoms, a divalent cycloaliphatic hydrocarbon radical having 6 to 15 carbon atoms, a divalent aromatic carbon radical having 6 to 15 carbon atoms, or a divalent araliphatic hydrocarbon radical having 7 to 15 carbon atoms. Examples of diisocyanates are tetramethylene diisocyanate, methylpentamethylene diisocyanate, hexamethylene diisocyanate, dodecamethylene diisocyanate, 1,4-diisocyanato-cyclohexane, 1-isocyanato-3,3,5-trimethyl-5-isocyanatomethyl-cyclohexane (IPDI, isophorone diisocyanate), 4,4'-diisocyanato-dicyclohexyl-methane, 4,4'-diisocyanato-dicyclohexylpropane-(2,2), 1,4-diisocyanatobenzene, 2,4-diisocyanatotoluene, 2,6-diisocyanatotoluene, 4,4'-diisocyanato-diphenylmethane, 2,2'- and 2,4'-diisocyanato-diphenylmethane, tetramethyl xylylene diisocyanate, p-xylylene diisocyanate, p-isopropylidene diisocyanate, and mixtures of these compounds.

In addition to these simple diisocyanates, also suitable are those polyisocyanates which contain hetero atoms in the radical linking the isocyanate groups and/or have a functionality of more than 2 isocyanate groups in each molecule. The first are for example polyisocyanates which are obtained by modifying simple aliphatic, cycloaliphatic, araliphatic and/or aromatic diisocyanates and which comprise at least two diisocyanates with a uretdione, isocyanurate, urethane, allophanate, biuret, carbodiimide, iminooxadiazinedione and/or oxadiazinetrione structure. As an example of a non-modified polyisocyanate having more than 2 isocyanate groups in each molecule there may for example be mentioned 4-isocyanatomethyl-1,8-octane diisocyanate (nonane triisocyanate).

In certain examples, the polyisocyanate comprises an asymmetric diisocyanate trimer (iminooxadiazine dione ring structure) such as, for example, the asymmetric diisocyanate trimers described in U.S. Pat. No. 5,717,091, which is incorporated by reference into this specification.

Diisocyanates (B) can be hexamethylene diisocyanate (HDI), dodecamethylene diisocyanate, 1,4-diisocyanato-cyclohexane, 1-isocyanato-3,3,5-trimethyl-5-isocyanatomethyl-cyclohexane (IPDI), 4,4'-diisocyanato-dicyclohexylmethane, 2,4-diisocyanatotoluene, 2,6-diisocyanatotoluene, 4,4'-diisocyanato-diphenylmethane, 2,2'- and 2,4'-diisocyanato-diphenylmethane and mixtures of these compounds. In certain examples, the polyisocyanate comprises an asymmetric diisocyanate trimer based on hexamethylene diisocyanate (HDI), 1-isocyanato-3,3,5-trimethyl-5-isocyanatomethyl-cyclohexane (IPDI); or a combination thereof.

The content of component (B) in the polyurethane according to this disclosure is from 5 to 60 wt. %, 6 to 45 wt. %, and 7 to 25 wt. %.

Suitable polyisocyanates are available under the DESMODUR and BAYHYDUR names from Covestro LLC, Pittsburgh, Pennsylvania.

Suitable components (C) can be, for example, components containing sulfonate or carboxylate groups, such as, diamine compounds or dihydroxyl compounds which additionally contain sulfonate and/or carboxylate groups, such as, the sodium, lithium, potassium, t-amine salts of N-(2-aminoethyl)-2-aminoethane sulfonic acid, N-(3-aminopropyl)-2-aminoethane sulfonic acid, N-(3-aminopropyl)-3-aminopropane sulfonic acid, N-(2-aminoethyl)-3-aminopropane sulfonic acid, analogous carboxylic acids, dimethylol propionic acid, dimethylol butyric acid, the reaction products from a Michael addition of 1 mol of diamine such as 1,2-ethane diamine or isophorone diamine with 2 mol of acrylic acid or maleic acid.

The acids can be used directly in the form of their salt as a sulfonate or carboxylate. However, it is also possible to add the neutralizing agent needed for formation of the salt in portions or in its entirety only during or after the polyurethanes have been prepared.

For forming salts, tertiary amines can be used, such as, for example, triethylamine, dimethyl cyclohexylamine and ethyl diisopropylamine. It is also possible to use other amines for the salt formation, such as ammonia, diethanolamine, triethanolamine, dimethylethanolamine, methyldiethanolamine, aminomethyl propanol, and also mixtures of the said and indeed other amines. It is sensible to add these amines only after the prepolymer has been formed.

It is also possible to use other neutralizing agents, such as sodium, potassium, lithium or calcium hydroxide for neutralizing purposes.

Other suitable components (C) can be mono- or difunctional polyethers which have a non-ionic hydophilising action and are based on ethylene oxide polymers or ethylene oxide/propylene oxide copolymers which are started on alcohols or amines, such as POLYETHER LB 25 (Covestro AG) or MPEG 750: methoxypolyethylene glycol, molecular weight 750 g/mol (e.g. PLURIOL 750, BASF AG).

Components (C) can be N-(2-aminoethyl)-2-aminoethane sulfonate and the salts of or dimethylol propionic acid and dimethylol butyric acid.

The content of component (C) in the polyurethane according to the present disclosure can be 0.1 to 15 wt. %, 0.5 to 10 wt. %, 0.8 to 5 wt. %, or 0.9 to 3.0 wt. %.

Suitable components (D) can be mono-, di-, trifunctional amines and/or mono-, di-, trifunctional hydroxylamines, such as aliphatic and/or alicyclic primary and/or secondary monoamines such as ethylamine, diethylamine, isomeric propyl and butyl amines, higher linear aliphatic monoamines and cycloaliphatic monoamines such as cyclohexylamine. Further examples are amino alcohols, that is compounds which contain amino and hydroxyl groups in one molecule, such as ethanolamine, N-methyl ethanolamine, diethanolamine, diisopropanolamine, 1,3-diamino-2-propanol, N-(2-hydroxyethyl)-ethylene diamine, N,N-bis(2-hydroxyethyl)-ethylene diamine and 2-propanolamine. Further examples can be diamines and triamines, such as 1,2-ethane diamine, 1,6-hexamethylene diamine, 1-amino-3,3,5-trimethyl-5-aminomethyl cyclohexane (isophorone diamine), piperazine, 1,4-diamino cyclohexane, bis-(4-aminocyclohexyl)-methane and diethylene triamine. Also possible are adipic acid dihydrazide, hydrazine and hydrazide hydrate. Mixtures of a plurality of the compounds (D), optionally also those with compounds that are not mentioned, may also be used.

Components (D) can be 1,2-ethane diamine, 1-amino-3,3,5-trimethyl-5-aminomethyl cyclohexane, diethylene triamine, diethanolamine, ethanolamine, N-(2-hydroxyethyl)-ethylene diamine and N,N-bis(2-hydroxyethyl)-ethylene diamine.

Components (D) can serve as chain extenders for creating higher molecular weights or as monofunctional compounds for limiting molecular weights and/or optionally additionally for incorporating further reactive groups, such as free hydroxyl groups as further crosslink points.

The content of component (D) in the polyurethane according to the present disclosure can be from 0 to 10 wt. %, 0 to 5 wt. %, or 0.2 to 3 wt. %.

Component (E) which may optionally also be used may for example be aliphatic, cycloaliphatic or aromatic monoalcohols having 2 to 22 C atoms, such as ethanol, butanol, hexanol, cyclohexanol, isobutanol, benzyl alcohol, stearyl alcohol, 2-ethyl ethanol, cyclohexanol; blocking agents which are conventional for isocyanate groups and may be split again at elevated temperature, such as butanone oxime, dimethylpyrazole, caprolactam, malonic esters, triazole, dimethyl triazole, t-butyl-benzyl amine, cyclopentanone carboxyethyl ester.

The content of components (E) in the polyurethane according to the present disclosure may be in quantities from 0 to 20 wt. % or 0 to 10 wt. %.

The polyurethane polymers used according to this disclosure may contain di- or higher-functional polyester polyols (A), based on linear dicarboxylic acids and/or derivatives thereof, such as anhydrides, esters or acid chlorides and aliphatic or cycloaliphatic, linear or branched polyols. The polyurethane polymers can be used in quantities of at least 80 mol %, such as, for example, from 85 to 100 mol % or from 90 to 100 mol %, in relation to the total quantity of all carboxylic acids.

Optionally, other aliphatic, cycloaliphatic or aromatic dicarboxylic acids may also be used. Examples of such dicarboxylic acids can be glutaric acid, azelaic acid, 1,4-, 1,3- or 1,2-cyclohexane dicarboxylic acid, terephthalic acid or isophthalic acid. These are used in quantities of at most 20 mol %, such as, for example, from 0 to 15 mol % or from 0 to 10 mol %, in relation to the total quantity of all carboxylic acids.

Polyol components for the polyesters (A) can be selected from the group comprising monoethylene glycol, propanediol-1,3, butanediol-1,4, pentanediol-1,5, hexanediol-1,6 and neopentyl glycol, and particularly preferred as the polyol component are butanediol-1,4 and hexanediol-1,6, and most particularly preferred is butanediol-1,4. These can be used in quantities of at least 80 mol %, such as, 90 to 100 mol %, in relation to the total quantity of all polyols.

Optionally, other aliphatic or cycloaliphatic, linear or branched polyols may also be used. Examples of polyols of this kind are diethylene glycol, hydroxypivalic acid neopentyl glycol, cyclohexane dimethanol, pentanediol-1,5, pentanediol-1,2, nonanediol-1,9, trimethylol propane, glycerine or pentaerythritol. These can be used in quantities of at most 20 mol %, such as, for example, 0 to 10 mol %, in relation to the total quantity of all polyols.

Mixtures of two or more polyesters (A) of this kind are also possible.

The polyurethane dispersions according to the present disclosure can have solids contents of from 15 to 70 wt. %, 25 to 60 wt. %, or 30 to 50 wt. %. The pH can be in the range from 4 to 11 or 6 to 10.

The waterborne polyurethane dispersions useful in the present disclosure may be prepared such that the components (A), (B) optionally (C) and optionally (E) are reacted in a single-stage or multi-stage reaction to give an isocyanate-functional prepolymer which is then, optionally with component (C) and optionally (D), reacted in a single-stage or two-stage reaction and then dispersed in or using water, wherein solvent used therein may optionally be removed, partially or entirely, by distillation during or after the dispersion.

The waterborne polyurethane or polyurethane urea dispersions according to the present disclosure may be prepared in one or more stages in a homogeneous or, in the case of a multi-stage reaction, partly in a disperse phase. After the polyaddition has been partially or entirely performed, a step of dispersion, emulsification or solution can be carried out. Then a further polyaddition or modification in a disperse phase can be optionally carried out. For the preparation, any methods known from the prior art may be used, such as the emulsifier/shear force method, acetone method, prepolymer mixing method, melting/emulsifying method, ketimine method and spontaneous dispersion of solids method, or derivatives thereof. A summary of these methods can be found in Methoden der organischen Chemie (Houben-Weyl, supplemental volumes to the 4th edition, Volume E20, H. Bartl and J. Falbe, Stuttgart, New York, Thieme 1987, pp. 1671-1682). The melting/emulsifying method, prepolymer mixing method and acetone method can be preferred. The acetone method can be particularly preferred.

In principle, it is possible to measure out all the components—all the hydroxy-functional components—together, and then to add all the isocyanate-functional components and react them to give an isocyanate-functional polyurethane, which can then be reacted with the amino-functional components. Preparation is also possible the other way round, that is taking the isocyanate component, adding the hydroxy-functional components, reacting to give polyurethane and then reacting with the amino-functional components to give the end product.

All or some of the hydroxy-functional components (A), optionally (C) and optionally (E) for preparing a polyurethane prepolymer can be put into the reactor, optionally diluted with a water-miscible solvent which can be, however, inert to isocyanate groups, and then homogenized. Then the component (B) is added at room temperature to 120° C. and an isocyanate-functional polyurethane can be prepared. This reaction may be performed in a single stage or in multiple stages. A multi-stage reaction may be carried out for example in that a component (C) and/or (E) is reacted with the isocyanate-functional component (B) and then a component (A) is added thereto and can then be reacted with some of the isocyanate groups that are still present.

Suitable solvents can be for example acetone, methyl isobutyl ketone, butanone, tetrahydrofuran, dioxan, acetonitrile, dipropylene glycol dimethyl ether and 1-methyl-2-pyrrolidone, which may be added not only at the start of preparation but optionally also later in portions. Acetone and butanone can be preferred. It is possible to perform the reaction at standard pressure or under elevated pressure.

To prepare the prepolymer, the quantities of hydroxyl-functional and, optionally, amino-functional components that are used are such that a ratio of isocyanate of 1.05 to 2.5, 1.15 to 1.95, or 1.2 to 1.7 can be produced.

The further reaction, the so-called chain extension, of the isocyanate-functional prepolymer with further hydroxy- and/or amino-functional, preferably only amino-functional components (D) and optionally (C) is performed such that a degree of conversion of 25 to 150% or 40 to 85%, of hydroxyl and/or amino groups in relation to 100% isocyanate groups can be selected.

In the case of degrees of conversion greater than 100%, which are possible but less preferred, it is appropriate first to react all the components which are monofunctional for the isocyanate addition reaction with the prepolymer, and then to use the di- or higher-functional chain-extending components to obtain the greatest possible degree of incorporation of all the chain-extending molecules.

The degree of conversion can be monitored by tracking the NCO content of the reaction mixture. For this, both spectroscopic measurements, such as infrared or near infrared spectra or determination of the refractive index, and chemical analyses such as the titration of samples may be carried out.

To accelerate the isocyanate addition reaction, conventional catalysts such as those known to those skilled in the art for acceleration of NCO—OH reactions may be used. Examples are triethylamine, 1,4-diazabicyclo-[2,2,2]-octane, dibutyltin oxide, tin dioctoate or dibutyltin dilaurate, tin-bis-(2-ethyl hexanoate), zinc dioctoate, zinc-bis-(2-ethyl hexanoate) or other organo-metallic compounds.

The chain of the isocyanate-functional prepolymer may be extended with the component (D) and optionally (C) before, during or after dispersion. The chain extension can be carried out before dispersion. If component (C) is used as the chain-extending component, then it is imperative that chain extension with this component be carried out before the dispersion step. Conventionally, the chain extension is carried out at temperatures of 10 to 100° C. or 25 to 60° C.

The term chain extension, in the context of the present disclosure, also includes the reactions of optionally monofunctional components (D) which, as a result of their monofunctionality, act as chain terminators and thus result not in an increase but a limitation of the molecular weight.

The components of chain extension may be added to the reaction mixture diluted with organic solvents and/or water. They may be added successively, in any order, or at the same time by adding a mixture.

For the purpose of preparing the polyurethane dispersion, the prepolymer may either be added to the dispersion liquid, optionally under pronounced shear, such as vigorous stirring, or conversely the dispersion liquid is stirred into the prepolymer. Then the chain extension step is carried out, unless this has already been done in the homogeneous phase.

During and/or after dispersion, the organic solvent which is optionally used, such as acetone, is distilled off.

Polyurethane dispersions useful in the practice of the present disclosure may be found under the BAYHYDROL, DISPERCOLL and IMPRANIL tradenames from Covestro LLC, Pittsburgh, Pennsylvania.

A crosslinker useful in the practice of the present disclosure may be found under the BAYHDUR tradename from Covestro LLC, Pittsburgh, Pennsylvania.

Figure 1:
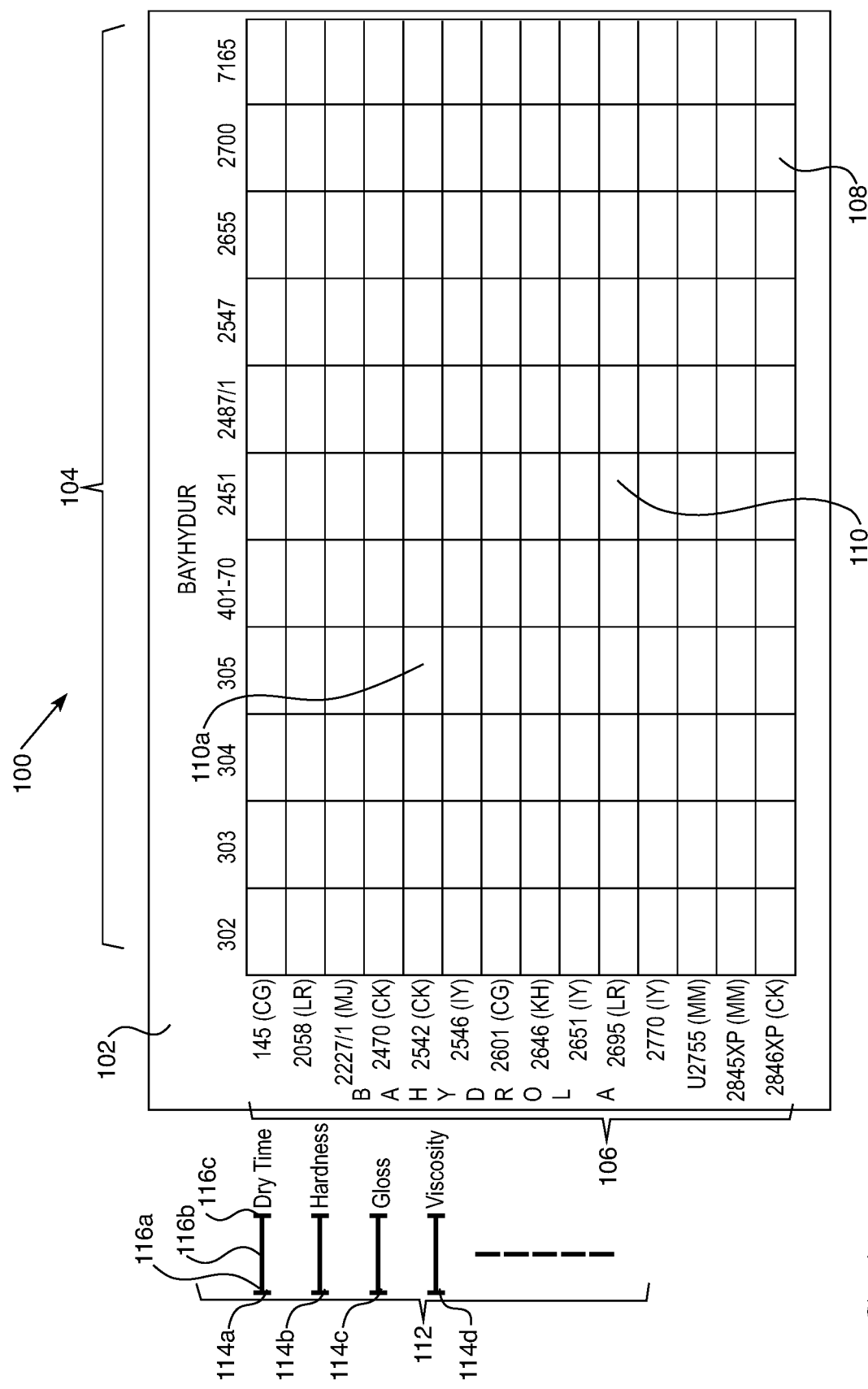
FIG. 1 is an example of a graphical depiction of a value of a property of a material according to the present disclosure in a data entry mode.

Referring to FIG. 1, a graphical depiction 100 displaying a plot 102 is provided. The plot 102 can be utilized to populate a database with various variables and properties (e.g., data entry mode) and/or generate a visual representation of values of a property of a material (e.g., data explorer mode). Data entry mode and data explorer mode can be selected based on user access privileges and/or an interactive button displayed in the graphical depiction 100.

The plot 102 can define a geometric shape, a first axis 104 comprising a plurality of first variables, and a second axis 106 comprising a plurality of second variables. A plurality of points 110 can be generated and arranged in a matrix 108 based on the first variables and the second variables. The first variables and the second variables can be independent variables.

The first variables can each represent a different first component of a material. For example, the first component can comprise a polyisocyanate, a polyol, another component of a PUD, another component of a crosslinker, or combinations thereof. The first axis 104 can comprise a title, such as, for example, a genus of the first component (e.g., BAYHYDUR as illustrated in FIG. 1). The first variables can comprise different species of the first component and can be displayed along the first axis 104. As illustrated, the first variables can be, for example, 302 (e.g., representing BAYHYDUR 302), 303, 304, 305, 401-70, 2451, 2487/1, 2547, 2655, 2700, and 7165.

The second variables can each represent a different second component of the material. For example, the second component can comprise a polyisocyanate, a polyol, another component of a PUD, another component of a crosslinker, or combinations thereof. The second axis 106 can comprise a title, such as, for example, a genus of the second component (e.g., BAYHYDROL A as illustrated in FIG. 1). The second variables can comprise different species of the second component and can be displayed along the second axis 106. As illustrated, the second variables can be, for example, 145 (CG) (e.g., representing BAYHDROL 145 (CG)), 2058 (LR), 2227/1 (MJ), 2470 (CK), 2542 (CK), 2546 (IY), 2601 (CG), 2646 (KH), 2651 (IT), 2695 (LR), 2770 (IY), U2755 (MM), 2845XP (MM), and 2846XP (CK).

The geometric shape may include a closed shape defining n-sided polygons such as pentagons, hexagons, heptagons, octagons, and so forth. The geometric shape may include a closed shape defining an ellipse or a circle. The geometric shape may define either a two-dimensional space or a two-dimensional perspective projection of a three-dimensional shape. The geometric shape can define a closed shape in Euclidian space such as, for example, a four-sided polygon. In four-sided polygon examples, each of the points may define a value for two variables, wherein each variable is, for example, a value for a component of a material. The geometric shape can enable a user to design materials using resins, or other materials, based on properties of interest. Many degrees of freedom can be embedded in the software, allowing the user to explore an entire design space of available materials. Where the material is a polyurethane foam, the graphical depiction can plot an isocyanate component versus a polyol component. If desired, however, the user may change a component type on an axis.

As illustrated, the plot 102 can be gridded to form a table comprising a plurality of rows and a plurality of columns. The first axis 104 can correspond to the plurality of columns and the first variables can be headers of the plurality of columns. The second axis 106 can correspond to the plurality of rows and the second variables can be headers of the plurality of rows. Each point 110 can represent the material formed by the intersection of one of columns and one of rows of the table. For example, each of the points 110 can define a value of a property of a material formed by a combination of one of the first variables and one of the second variables. In various examples, each of the points 110 can define a value of a property of the material formed by a combination of one of the first variables and one of the second variables. The property of the material can be, for example, at least one of dry time, shelf life, pendulum hardness, chemical resistance, gloss, haze, distinctness of image (DOI), viscosity, taber abrasion, adhesion, brush test, impact test, tensile strength, tear strength, compression set, water resistance, and volatile organic carbon (VOC) content.

The plurality of points 110 can represent a database, such as, for example, a relational database. The database can be used to generate plots, points, and/or matrices to enable users to custom-design various materials by manipulating constraints 112 in the graphical depiction 100 and displaying a visual representation of the results on a screen or display of a computer, tablet, smartphone, or other web based client appliance. The database can comprise real measurement data (e.g., properties that were tested) or the database can be generated from an algorithm and/or model (e.g., from a statistical software application). In examples comprising real measurement data, a material can be created from components (e.g., mixed, cured) and a value of a property of a material of the material can be tested. The values of the material properties can be recorded in the database as illustrated in FIGS. 2A-F and described herein.

For example, point 110a can be generated based on first variable, BAYHYDROL A 2542 (CK), and second variable, BAYHYDUR 305, which forms a mixture which can be cured to form a polyurethane material. Point 110a defines a value of a property of the formed polyurethane material. In data entry mode, a user can click on point 110a and thereafter, a secondary window 200 can overlay the plot 102 as shown in FIG. 2A in order to populate values of properties into a database for the material corresponding to point 110a.

The secondary window 200 can comprise input elements 218 configured to receive values for each property. For example, as illustrated in FIG. 2A, the secondary window 200 is configured to receive values for dry time, shelf life, pendulum hardness 1 d, pendulum hardness 7d, isopropanol (IPA) resistance, water resistance, gasoline resistance, skydrol resistance, acetic acid resistance, brake fluid resistance, sodium hydroxide resistance, gloss 20, gloss 60, gloss 80, viscosity, taber abrasion, adhesion to aluminum, adhesion to B1000, adhesion to B952, brush test, haze, solids, volatile organic compounds (VOC), roll, and DOI.

The values can be various types, such as, for example, numeric, alphabetical, or alphanumeric. Each input element 218 can be configured to receive a particular type of value. Responsive to receipt of an incorrect value type in an input element 218, the secondary window 200 can generate feedback which can be displayed proximal to the respective input element 218 containing the incorrect value type. For example, as illustrated in FIG. 2B, the input element 218 for dry time can be configured to receive a numeric value only (e.g., numbers and decimals) and an input value comprising alphabetical or alphanumeric string (e.g., "4.6f") can generate feedback (e.g., "Please enter numbers and decimals only") which is displayed proximal to the input element 218 for dry time in the secondary window 200.

Referring to FIG. 2C, input elements 218 can each be configured with an icon 236 configured to generate a child input element 238 upon interaction with (e.g., click, hover) the icon 236. The additional input element 238 can receive additional input corresponding to the respective input element 218 (e.g., parent input element) such as, for example, comments. In various examples, an input element can be configured to receive comments generally (not shown) for the respective material that may not be associated with a particular input element.

Figure 2D:
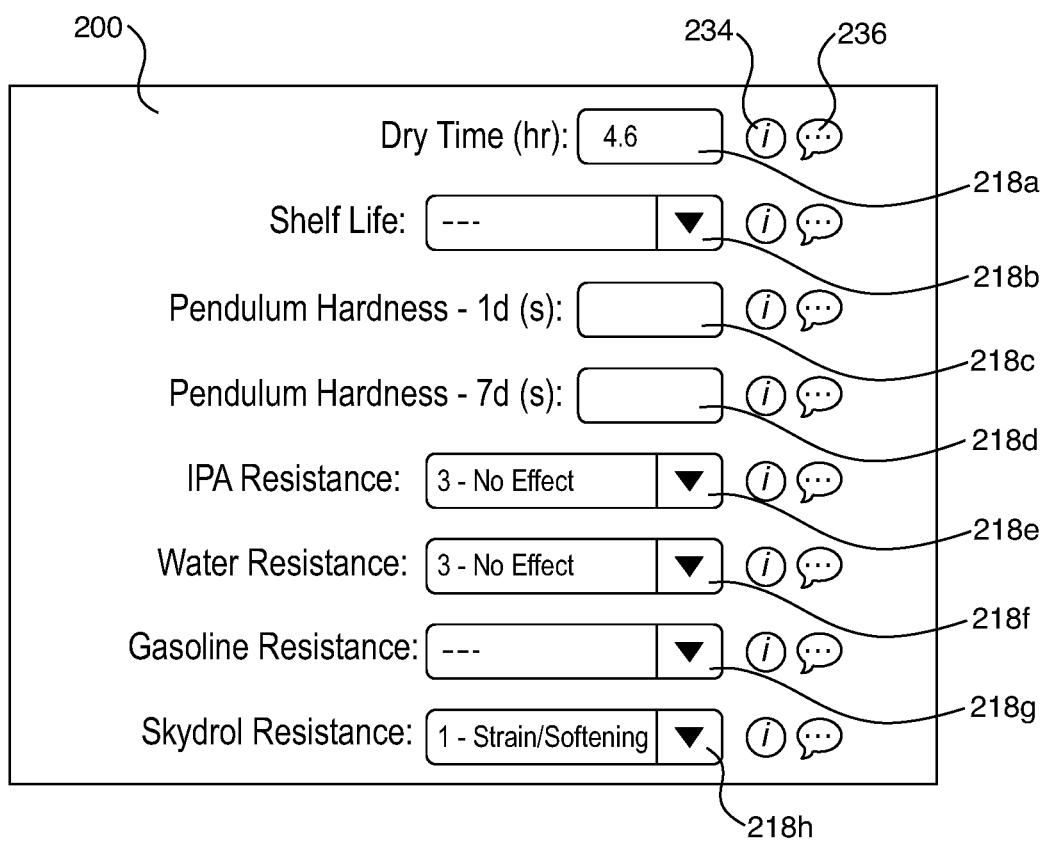
FIG. 2D is an example of a portion of the secondary window of FIG. 2A illustrating input elements which comprise a drop down list or a text box.

The input elements 218 can be configured as a text box and/or a listbox. For example, as shown in FIG. 2D, the input elements 218a, 218c, and 218d can be configured as text boxes and input elements 218b, 218e, 218f, 218g, and 218h can be configured as a listbox. Upon interaction with the respective listbox, a drop-down menu can be displayed and predetermined values can be displayed. A predetermined value can be selected from the drop-down menu. For example, as illustrated, the value "3—No Effect" was selected for input elements 218e and 218f and the value "1—Stain/Softening" was selected for input element 218h.

Figure 2E:
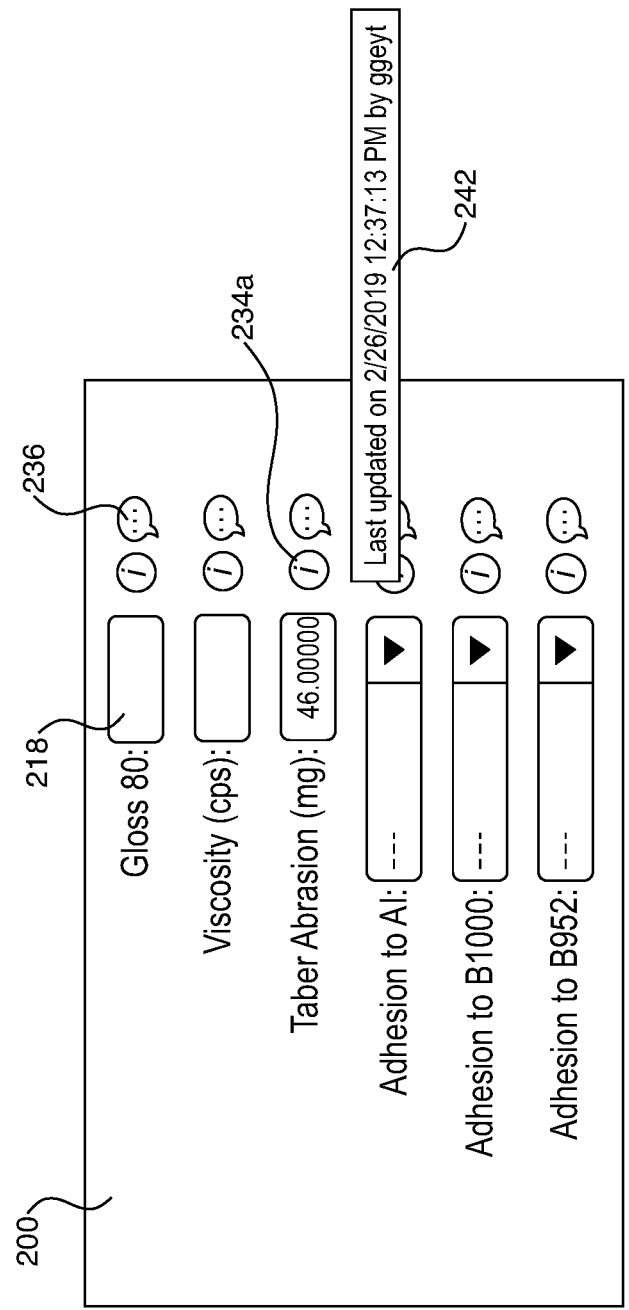
FIG. 2E is an example of a portion of the secondary window of FIG. 2A illustrating a last revision element.

Referring to FIG. 2E, interaction with an icon 234 can display a revision status box corresponding to the respective input element 218. The revision status box can comprise at least one of a time the respective input element 218 was last updated, a date the respective input element 218 was last updated, and an identifier for a user who last updated the respective input element 218. For example, upon hovering cursor 240 over the icon 234a, a revision status box 242 can be displayed proximal to the icon 234a which displays the date "2/26/2019" and the time "12:37:13 PM" of the last update to the value in the input element 218 for Taber Abrasion and the identifier "ggeyt" corresponding to the user who last updated the input element 218 for Taber Abrasion.

In various examples, a user can modify the input elements 218. For example, the user can remove and/or add an input element for a property of the material. As illustrated in FIG. 2F, interaction with a button 220 can store the values in the input elements 218 in the database, thereby populating the database. Feedback can be displayed proximal to the button 220 after the values are stored in the database. Thereafter, the secondary window 200 may close, and the user can be returned to the plot 102.

The property of the material can be generated from a model, such as, for example, design of experiments, regression analysis of a data set, an equation, machine learning, artificial intelligence, and/or any combination thereof. In various examples, Design-Expert from Stat-Ease Inc. may be employed to generate model equations and/or generate a value of a property based on the first variable and the second variable. Other statistical software applications for generating model equations and/or a value of a property can be, for example, statistical software applications known under the trade name ECHIP, JMP, and/or Minitab. The output of the model can be automatically populated into the database based on the first variables and the second variables.

As shown in FIG. 1, the graphical depiction 100 can comprise a graphical representation of constraints 112. The constraints 112 can define a limit for a property of a material. For example, each constraint 112 can comprise an upper limit 116a, a lower limit 116b, and combinations thereof (e.g., range 116c). In data explorer mode, each graphical depiction of a constraint 112 can comprise a slider 114a-d which can be manipulated to define the limit for a property of a desired material. For example, by moving the lower limit 116a and/or upper limit 116b to the right, the value for the respective limit can increase. By moving the lower limit 116a and/or upper limit 116b to the left the value for the respective limit can decrease. The movement of the lower limit 116a and/or upper limit 116b can affect the range 116c. In various examples, each graphical depiction of a constraint 112 can comprise a listbox (not shown) which can be manipulated to define the limit for a property of a desired material.

As illustrated, slider 114a is configured to define a limit for a value of dry time, slider 114b is configured to define a limit for a value of hardness, slider 114c is configured to define a limit for a value of gloss, and slider 114d is configured to define a value of viscosity. The sliders 114a-d can be configured to define relative limits and/or absolute limits. For example, when sliders 114a-d are configured to define relative limits they can have a maximum constraint value based on a maximum value present in the values for the corresponding property in the plurality of points 110 and/or a minimum constraint value based on a minimum value present in the values for the corresponding property in the plurality of points 110. When sliders 114a-d are configured to define absolute limits they may have maximum and/or minimum constraint values that may not be based on the values in the plurality of points 110. For example, the maximum and/or minimum constraint values can be independently defined.

Figure 3:
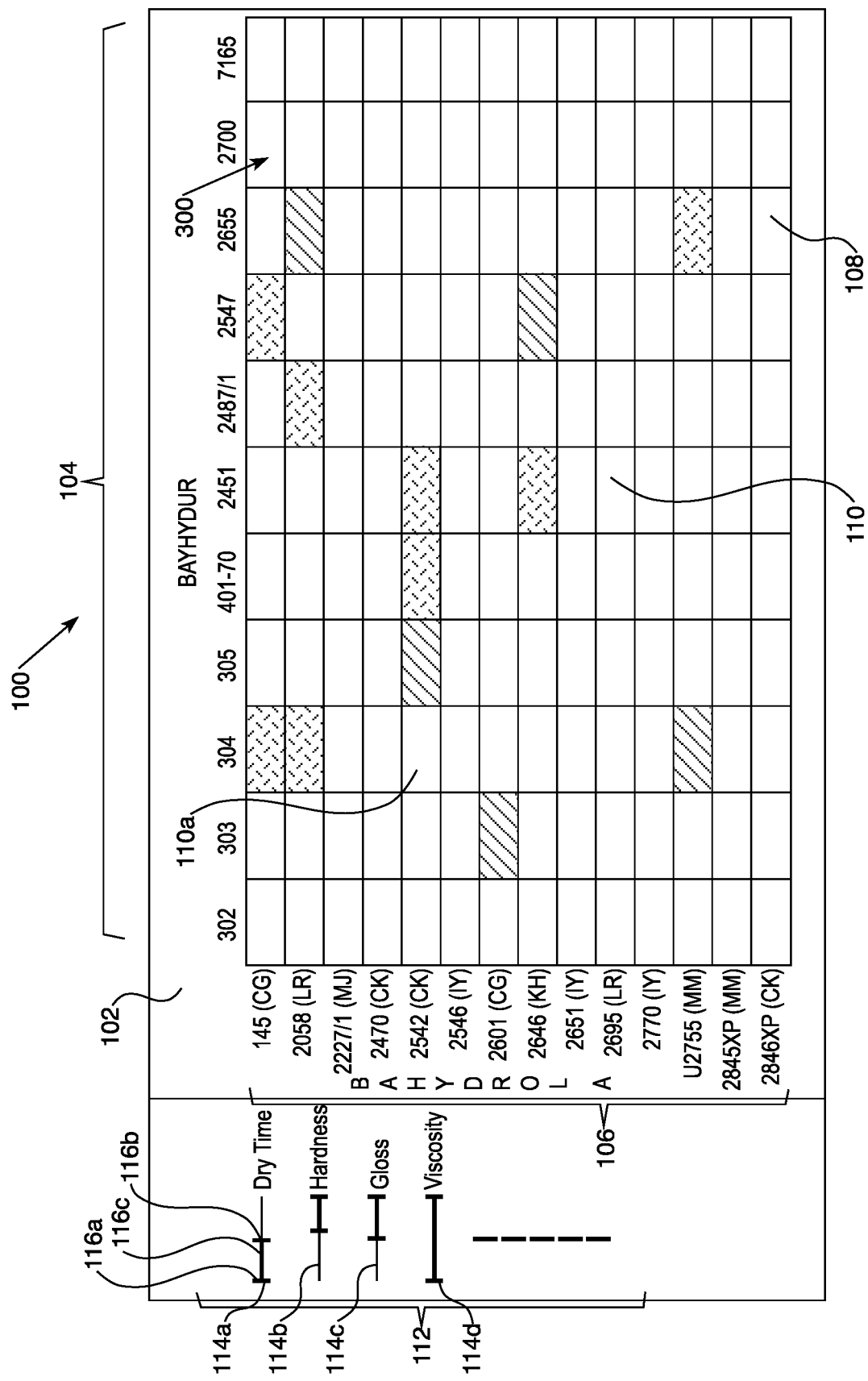
FIG. 3 is an example of a visual representation of the respective values of the properties of the material compared to the constraints at various points according to the present disclosure in a data explorer mode.

After values for constraints 112 are defined in data explorer mode, a visual representation 300 of the respective values of the properties of the material compared to the constraints 112 at various points (e.g., at least two or each point) can be displayed as illustrated in FIG. 3. The visual representation 300 can be in a range of indicia based on a comparison of a constraint and a respective value corresponding to the constraint. The range of indicia can be a range of colors and/or a range of score values. The score values can correspond to the number of constraints that are within the limits of the constraints for each respective property (e.g., [number of properties within limits of respective constraints]/[total constraints]). The range of colors can be defined and/or selected by a user.

The comparison can comprise a determination if the value of the property at the points 110 is within the limits 116a-c of a constraint 112. For example, a respective value of the property can be considered within the limits 116a-c of a constraint 112 if the value is greater than or equal to the lower limit 116a of the constraint 112, less than or equal to the upper limit 116b of the constraint 112, and/or within the range 116c of the constraint 112 defined by the upper limit 116b and lower limit 116a. In examples comprising a single constraint 112, points 110 that comprise a value of a property within the limits of constraint 112 can be displayed in a first color while points 110 that comprise a value of a property that is outside the limits 116a-c of the constraint 112 can be displayed in a second color. In examples comprising at least two constraints 112, points 110 that comprise values of a property within limits 116a-c of the at least two constraints 112 can be displayed in a first color while points 110 that comprise values of properties that are outside the limits 116a-c of the constraints 112 can be displayed in a second color.

At least two colors can be used to indicate the number of values of properties at the points 110 that are within the constraints 112. In other examples, additional colors can be used. For example, at least three colors can be used including a first color which can indicate that none of or less than a threshold number of the values of the properties at the point 110 are within the limits of the at least two constraints 112 based on the comparison; a second color which can indicate that a threshold number of the values of properties at the point 110 are within the limits of the at least two constraints 112 based on the comparison; and a third color which can indicate that greater than a threshold number of the values of properties at the point 110 are within the limits of the at least two constraints 112 based on the comparison. The first, second, and third colors can be different. For example, the first color can be red, the second color can be yellow, and the third color can be green. The threshold number can be defined by the user or predefined in the software.

The range of indicia can indicate which materials may be suitable and which materials may not be suitable in an easy to understand visual representation 300 of the comparison as illustrated in FIG. 3. The range of indicia can enable a rapid selection of a material that is suitable to the user's application based on the constraints 112. For example, the visual representation 300 can be a heat map which is a graphical representation of data, wherein the comparison of the constraints 112 to the values of properties at the points 110 are represented as colors, such as, for example, a color scale.

The visual representation 300 of the respective values of the property of the material at the at least two of the plurality of the points 110 in the range of indicia can be updated based on a change in the constraints 112. For example, the limits 116a-c of the constraints 112 can be dynamically adjusted by a user and the visual representation 300 can be updated accordingly. The visual representation 300 can be updated based on the configuration of the sliders 114a-d. For example, a user can click a cursor on the lower limit 116a or upper limit 116b and drag the respective limit 116a, 116b with the curser to a desired value. Based on the adjusted constraint, the constraints 112 can be compared to the values of the properties at the points 110 and the range of indicia can be updated based on the comparison.

Referring to FIG. 4A, a graphical depiction 400 displaying a plot 402 in data explorer mode is provided. The plot 402 can be configured as plot 102. For example, the plot 402 can define a geometric shape, a first axis 104 comprising a plurality of first variables, and a second axis 106 comprising a plurality of second variables. A plurality of points 110 can be generated and arranged in a matrix 108 based on the first variables and the second variables. A visual representation 401 of the respective values of the properties of the material compared to the constraints 112 at various points 110 can be displayed. The visual representation 401 can be in a range of indicia based on a comparison of a constraint 112 and a respective value in the points 110 corresponding to the constraint 112. As illustrated in FIG. 4A, the range of indicia can be a range of colors and a range of score values.

The graphical depiction 400 can comprise a graphical representation of constraints 112, a graphical representation of first variables 444, and a graphical representation of second variables 446. The user can interact with the graphical representations of first variables 444 and the graphical representation of second variables 446 in order to change the respective variables displayed on the axis 104, 106 in the plot 102. For example, upon changing the selection of variables utilizing the respective graphical representations 444, 446, the plot 402 may be dynamically updated to display only the resins selected in the respective graphical representations 444, 446 as illustrated in FIG. 4B.

Figure 4C:
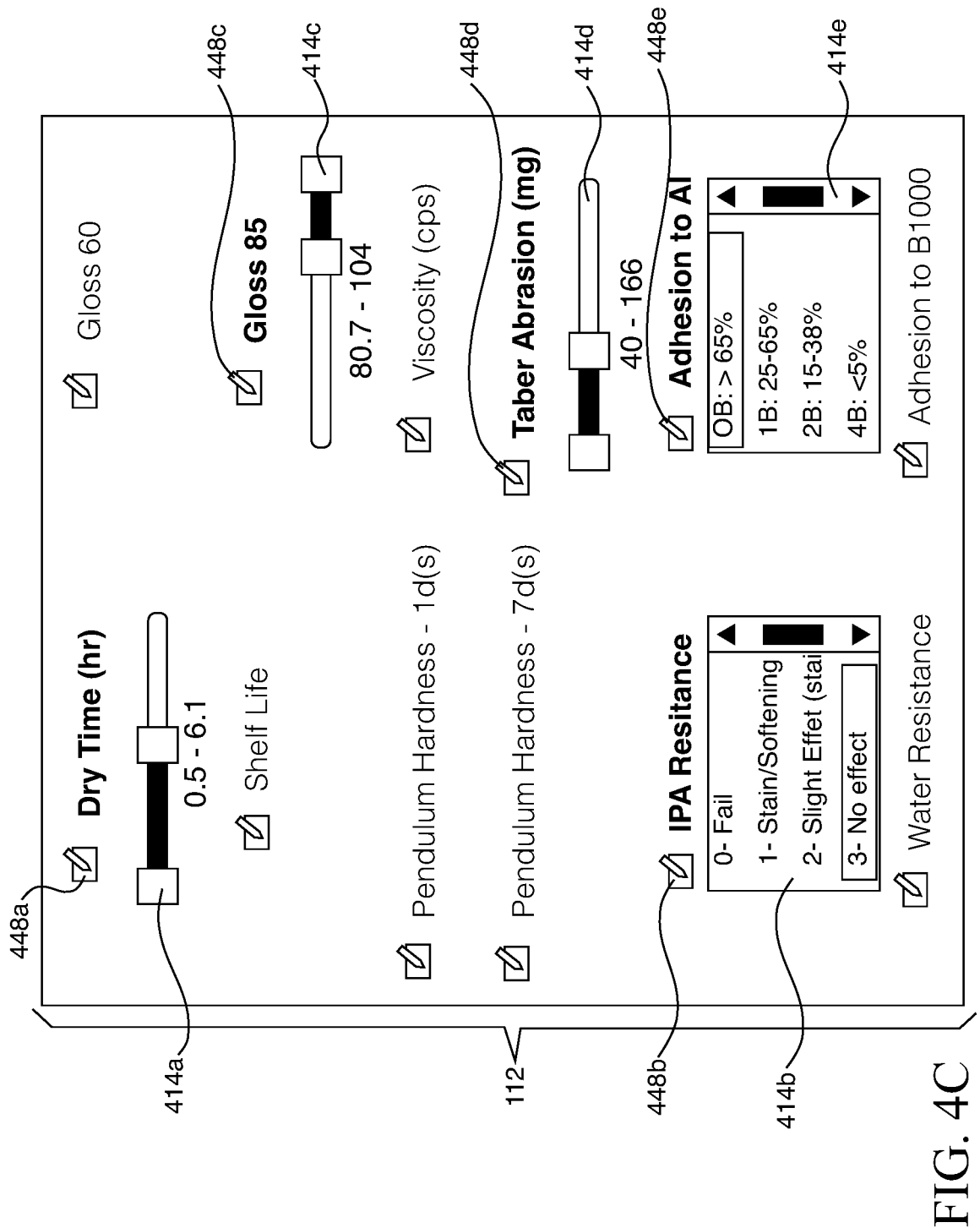
FIG. 4C is a detail view of the constraints in the visual representation of FIG. 4A.

Referring back to FIG. 4A, the constraints 112 can each comprise an icon 448 that can toggle the display of a listbox and/or slider which can be manipulated to define the limit for a property of a desired material. For example, interaction with the icon 448 can display a slider/listbox and a second interaction with the icon 448 can hide the slider/listbox. As illustrated in FIG. 4C, interaction with the icon 448a can display the slider 414a, interaction with icon 448b can display list box 414b, interaction with icon 448c can display slider 414c, interaction with icon 448d can display slider 414d, and interaction with icon 448e can display list box 414e. The respective slider/listbox 414a-e can be interacted with to adjust the respective limits of the constraints 112.

After adjusting the constraints 112 as illustrated in FIG. 4C and described herein, the visual representation 401 can be updated based on the adjusted constraints 112 as illustrated in FIG. 5. As illustrated, each point 110 comprises a color based on the number of respective values that are within the limits set by the constraints 112 and a score value.

The color of the respective point 110 can range, for example, from blue (e.g., score value of 24/24), to yellow (e.g., score value of 12/24), to red (e.g., score value of 0/24), and intermediate colors therebetween based on the score value. For example, point 510a can be generated based on first variable, BAYHYDUR 304, and second variable, BAYHYDROL A 2470, which forms a mixture which can be cured to form a polyurethane material. A comparison of the respective values of the properties in point 510a determined that 17 of respective values of properties of the material are within the limits set by the 24 constraints 112 which results in a score value of 17/24 and a color of yellow/green.

In data explorer mode, a user can click on point 510a and thereafter, a secondary window 600 can overlay the plot 102 (overlay not shown). Referring to FIG. 6, the secondary window 600 can comprise a report of a comparison of the respective values of the properties of the material in the point 510a and the constraints 112. For example, the secondary window 600 can comprise a display of the first and second variables, properties that comprise a value within the respective constraint 112 (e.g., matched), and properties that comprise a value outside of the respective constraint 112 (e.g., unmatched).

Referring to FIG. 10A, a graphical depiction 1000 displaying a plot 1002 in data explorer mode is provided. The plot 1002 can be configured as plot 102. For example, the plot 1002 can define a geometric shape, a first axis 104 comprising a plurality of first variables, and a second axis 106 comprising a plurality of second variables. A plurality of points 110 can be generated and arranged in a matrix 108 based on the first variables and the second variables. A visual representation 1001 of the respective values of the properties of the material compared to the constraints 112 at various points 110 can be displayed. The visual representation 1001 can be in a range of indicia based on a comparison of a constraint 112 and a respective value in the points 110 corresponding to the constraint 112.

As illustrated, the graphical depiction 1000 can comprise a graphical representations of properties 1050. The user can select a desired property to be displayed in the visual representation 1001 by interacting with the graphical representation of properties 1050. For example, upon selecting a desired property utilizing the graphical representation of properties 1050, the plot 1002 may be dynamically updated to display values of the selected property.

The graphical representation of properties 1050 can be configured as a listbox. Upon interaction with the listbox, a drop-down menu can be displayed and predetermined values (e.g., properties) can be displayed. A predetermined value can be selected from the drop-down menu and the plot 1002 can be dynamically updated. For example, as illustrated in FIG. 10B, the value "gloss 60" was selected utilizing the graphical representation of properties 1050 and the plot 1002 was dynamically updated to show the value of gloss 60 for each point 110. As illustrated in FIG. 10C, the value "water resistance" was selected utilizing the graphical representation of properties 1050 and the plot 1002 was dynamically updated to show the value of water resistance for each point 110.

Referring to FIGS. 7A-C, a set of instructions 700a-c for producing material based on the graphical depiction of a value of a property according to the present disclosure can be generated. The set of instructions 700a-c can be generated based on a comparison of the respective value of the property and the constraints 112 and/or based on a selection of a point in the graphical depiction. For example, a composition of a material can be formulated based on a point 110 in graphical depiction 100, 400. Once the desired material has been identified in FIG. 3, 4A, or 5, based on the comparison or by the user based on the range of indicia, the instructions can automatically be generated from data present in the database.

FIG. 8 illustrates an example computing environment 1700 wherein provisions set forth herein may be implemented. FIG. 8 illustrates an example of a system 1700 comprising a computing device 1712 configured to implement aspects provided herein. In one configuration, the computing device 1712 includes at least one processing unit 1716 and a memory 1718. Depending on the exact configuration and type of computing device, the memory 1718 may be volatile (such as RAM, for example), non-volatile (such as ROM, flash memory, etc., for example) or some combination of the two. This configuration is illustrated in FIG. 8 by a dashed line 1714.

In other examples, the computing device 1712 may include additional features and/or functionality. For example, the computing device 1712 also may include additional storage (e.g., removable and/or non-removable) including, but not limited to, magnetic storage, optical storage, and the like. Such additional storage is illustrated in FIG. 8 by a storage 1720. In various examples, computer readable instructions to implement one or more aspects provided herein may be stored in the storage 1720. The storage 1720 also may store other computer readable instructions to implement an operating system, an application program, and the like. Computer readable instructions may be loaded in the memory 1718 for execution by the processing unit 1716, for example.

The term "computer readable media" as used herein includes computer storage media. Computer storage media includes volatile and nonvolatile, removable and non-removable media implemented in any method or technology for storage of information such as computer readable instructions or other data. The memory 1718 and the storage 1720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by the computing device 1712. Computer storage media does not, however, include propagated signals. Rather, computer storage media excludes propagated signals. Any such computer storage media may be part of the computing device 1712.

The computing device 1712 also may include a communication connection(s) 1726 that allows the computing device 1712 to communicate with other devices such as the computing device 1730. The communication connection(s) 1726 may include, but is not limited to, a modem, a Network Interface Card (NIC), an integrated network interface, a radio frequency transmitter/receiver, an infrared port, a USB connection, or other interfaces for connecting the computing device 1712 to other computing devices. The communication connection(s) 1726 may include a wired connection or a wireless connection. The communication connection(s) 1726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

The computing device 1712 may include an input device(s) 1724 such as keyboard, mouse, pen, voice input device, touch input device, infrared cameras, video input devices, and/or any other input device. Output input device(s) 1722 such as a display, a speaker, a printer, and/or any other output device may also be included in the computing device 1712. The input device(s) 1724 and output device(s) 1722 may be connected to the computing device 1712 via a wired connection, wireless connection, or any combination thereof. In various examples, an input device or an output device from another computing device may be used as the input device(s) 1724 or the output device(s) 1722 for the computing device 1712.

Components of the computing device 1712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another example, components of the computing device 1712 may be interconnected by a network. For example, the memory 1718 may be comprised of multiple physical memory units located in different physical locations interconnected by a network.

Storage devices utilized to store computer readable instructions may be distributed across a network. For example, a computing device 1730 accessible via a network 1728 may store computer readable instructions to implement examples provided herein. The computing device 1712 may access the computing device 1730 and download a part or all of the computer readable instructions for execution. Alternatively, computing device 1712 may download pieces of the computer readable instructions, as needed, or some instructions may be executed at the computing device 1712 and some at the computing device 1730. The computing device 1730 may be coupled to a stored data table 1732. The contents of the data table 1732 can be accessed by both computing devices 1712, 1730. In various examples, the data table 1732 stores the database that is used to generate the visual representations described herein.

The computing device 1730 may include all or some of the components of the computing device 1712. For example, in various examples the computing device 1730 includes at least one processing unit and a memory, e.g., a volatile memory (such as RAM, for example), a non-volatile memory (such as ROM, flash memory, etc., for example) or some combination of the two. In other examples, the computing device 1730 may include additional storage (e.g., removable and/or non-removable) including, but not limited to, magnetic storage, optical storage, and the like. In one example, computer readable instructions to implement examples provided herein may be stored in the storage. The storage also may store other computer readable instructions to implement an operating system, an application program, and the like. Computer readable instructions may be loaded in the memory for execution by the processing unit, for example.

The computing device 1730 also may include a communication connection(s) that allows the computing device 1730 to communicate with other devices such as the computing device 1712. The communication connection(s) may include, but is not limited to, a modem, a Network Interface Card (NIC), an integrated network interface, a radio frequency transmitter/receiver, an infrared port, a USB connection, or other interfaces for connecting the computing device 1730 to other computing devices. The communication connection(s) may include a wired connection or a wireless connection. The communication connection(s) may transmit and/or receive communication media.

The computing device 1730 may include an input device(s) such as keyboard, mouse, pen, voice input device, touch input device, infrared cameras, video input devices, and/or any other input device. Output input device(s) such as a display, a speaker, a printer, and/or any other output device may also be included in the computing device 1730. The input device(s) and output device(s) may be connected to the computing device via a wired connection, wireless connection, or any combination thereof. In various examples, an input device or an output device from another computing device may be used as the input device(s) or the output device(s) for the computing device 1730.

Components of the computing device 1730 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another aspect, components of the computing device 1730 may be interconnected by a network. For example, the memory may be comprised of multiple physical memory units located in different physical locations interconnected by a network.

FIG. 9 is an example of a logic flow diagram of a logic configuration or process 900 of a method of producing a graphical depiction of a value of a property of a material according to the present disclosure. The process 900 may be executed in the computing environment 1700 described in connection with FIG. 8 based on executable instructions stored in the memory 1718 or the storage 1720. Input from the user is received by the processing unit 1716 from the input device(s) 1724. The computing device 1712 may be a client computer in communication with the computing device 1730 which may be a server coupled to a data table 1732 containing a database to a visual representation of the database.

According to the process 900, the processing unit 1716 can generate a plot defining a geometric shape, a first axis comprising a plurality of first variables, and a second axis comprising a plurality of second variables, 902. The geometric shape can define a closed shape in Euclidian space, such as, for example, a four-side polygon. The first variables and the second variables may be independent variables. Each of the first variables can represent a different first component and each of the second variables can represent a different second component. In various examples, the first component can be a polyisocyanate and the second component can be a polyol. The material can be a foam, a coating, an adhesive, a sealant, an elastomer, a sheet, a film, a binder, or any organic polymer.

The processing unit 1716 can generate a plurality of points arranged in a matrix based on the first variables and the second variables, 904. Each of the points can define a value of a property of a material formed by a combination of one of the first variables and one of the second variables. The property can be at least one of dry time, shelf life, pendulum hardness, chemical resistance, gloss, haze, DOI, viscosity, taber abrasion, adhesion, brush test, impact test, tensile strength, tear strength, compression set, water resistance, and volatile organic carbon content. In various examples, each of the points can define values of at least two properties of the material formed by a combination of one of the first variables and one of the second variables. The matrix can represent a relational database. The plurality of points may be dependent variables.

The processing unit 1716 can display a visual representation of the respective values of the property of the material at at least two of the plurality of points in a range of indicia on an output device, 906. In various examples, the processing unit 1716 displays a visual representation of the respective values of the property of the material at each of the plurality of points in a range of indicia on an output device. The range of indicia can represent a comparison of the respective value of the property or properties and a constraint or constraints. The visual representation can be a heat map and the range of indicia can be a range of colors. The constraint can be an upper limit, a lower limit, or combinations thereof (e.g., a range).

In various examples, the processing unit 1716 can display a representation of the constraint, such as, for example a slider or listbox, on the output device. The processing unit 1716 can display the plot including the first variables as headers in a plurality of columns and the second variables as headers in a plurality of rows on the output device. The plot can be gridded and each point can represent the material formed by an intersection of one of columns and one of rows.

The processing unit 1716 can update the visual representation of the respective values of the property of the material at the at least two of the plurality of points in the range of indicia based on a change in the constraint, 908. In various examples, the processing unit 1716 can update the visual representation of the respective values of the property of the material at each of the plurality of points in the range of indicia based on a change in the constraints.

The processing unit 1716 can generate a set of instructions for producing the material based on the comparison of the respective value of the property and the constraint, 910. In various examples, the processing unit 1716 generates a set of instructions for producing the material based on the comparison of the respective values of the properties and the constraints.

One skilled in the art will recognize that the herein described systems, methods, operations/actions, and objects, and the discussion accompanying them, are used as examples for the sake of conceptual clarity and that various configuration modifications are contemplated. Consequently, as used herein, the specific examples set forth and the accompanying discussion are intended to be representative of their more general classes. In general, use of any specific exemplar is intended to be representative of its class, and the non-inclusion of specific components, devices, operations/actions, and objects should not be taken as limiting. While the present disclosure provides descriptions of various specific aspects for the purpose of illustrating various aspects of the present disclosure and/or its potential applications, it is understood that variations and modifications will occur to those skilled in the art. Accordingly, the various aspects of the present disclosure should be understood to be at least as broad as they are claimed, and not as more narrowly defined by particular illustrative aspects provided herein.

What is claimed is:

1. A method of producing a graphical depiction of a value of a property of a polyurethane material, the method comprising:

generating, by a processing unit, a plot defining a geometric shape, a first axis comprising a plurality of first variables, and a second axis comprising a plurality of second variables;

generating, by the processing unit, a plurality of points arranged in a matrix based on the first variables and the second variables, each of the points defining a value of a property of a material formed by a combination of one of the first variables and one of the second variables; and displaying, on an output device, a visual representation of the respective values of the property of the material at at least two of the plurality of points in a range of indicia;

updating, by the processing unit, the visual representation of the respective values of the property of the material at the at least two of the plurality of points in the range of indicia based on a change in the constraint, wherein:

the constraint is changed by a slider or listbox;

each of the points defines values of a property of the material formed by a combination of one of the first variables and one of the second variables;

the range of indicia represents a comparison of the respective values of the property and a constraint for each property;

each of the first variables and the second variables represent different polyisocyanates or different polyols; and the polyurethane material is a foam, a coating, an adhesive, a sealant, an elastomer, a sheet, a film, a binder, or an organic polymer.

2. The method of claim 1, wherein displaying, on the output device, comprises displaying, on the output device, the visual representation of the respective values of the property of the material at each of the plurality of points in the range of indicia.

3. The method of claim 1, wherein displaying, on the output device, comprises displaying, on the output device, the plot including the first variables as headers in a plurality of columns and the second variables as headers in a plurality of rows.

4. The method of claim 3, wherein the plot is gridded and each point represents the material formed by an intersection of one of columns and one of rows.

5. The method of claim 1, wherein the first variables and the second variables are independent variables.

6. The method of claim 1, further comprising, displaying, on the output device, a representation of the constraint.

7. The method of claim 1, further comprising updating, by the processing unit, the visual representation of the respective values of the property of the material at the at least two of the plurality of points in the range of indicia based on a change in configuration of the slider or listbox.

8. The method of claim 1, wherein the range of indicia is at least one of a range of colors and a score value.

9. The method of claim 1, wherein the matrix represents a relational database.

10. The method of claim 1, further comprising generating, by the processing unit, a set of instructions for producing the material based on the comparison of the respective value of the property and the constraint.

11. The method of claim 1, wherein each first variable represents a different polyisocyanate, and each second variable represents a different polyol.

12. The method of claim 1, wherein each first variable represents a different polyol and each second variable represents a different polyisocyanate.

13. The method of claim 1, wherein the property is at least one of dry time, shelf life, pendulum hardness, chemical resistance, gloss, haze, distinctness of image, viscosity, taber abrasion, adhesion, brush test, impact test, tensile strength, tear strength, compression set, water resistance, and volatile organic carbon content.

14. The method of claim 1, wherein the constraint is an upper limit, a lower limit, or combinations thereof.

* * * * *